United States Patent
Kudo et al.

(10) Patent No.: US 8,932,394 B2
(45) Date of Patent: Jan. 13, 2015

(54) INK, INK CARTRIDGE AND INK JET RECORDING METHOD

(71) Applicant: Canon Kabushiki Kaisha, Tokyo (JP)

(72) Inventors: Satoshi Kudo, Kawasaki (JP); Junichi Sakai, Machida (JP); Masashi Ogasawara, Machida (JP); Tetsu Iwata, Yokohama (JP); Masashi Tsujimura, Kawasaki (JP); Takashi Saito, Kawasaki (JP); Masayuki Ikegami, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/946,018

(22) Filed: Jul. 19, 2013

(65) Prior Publication Data

US 2014/0043407 A1    Feb. 13, 2014

(30) Foreign Application Priority Data

Aug. 9, 2012 (JP) ................. 2012-176885

(51) Int. Cl.
| | |
|---|---|
| *C09D 11/02* | (2014.01) |
| *C09D 11/328* | (2014.01) |
| *B41J 2/175* | (2006.01) |
| *C09D 11/38* | (2014.01) |

(52) U.S. Cl.
CPC ........... *C09D 11/328* (2013.01); *B41J 2/17503* (2013.01); *C09D 11/38* (2013.01)
USPC ................... 106/31.5; 106/31.43; 106/31.58

(58) Field of Classification Search
CPC .... C09D 11/328; C09D 11/38; B41J 2/17503
USPC .............. 106/31.5, 31.43, 31.58; 347/86, 100
See application file for complete search history.

(56) References Cited

U.S. PATENT DOCUMENTS 5,540,764 A * 7/1996 Haruta et al. .............. 106/31.58
5,835,116 A   11/1998 Sato et al.

(Continued)

FOREIGN PATENT DOCUMENTS

| CN | 101538431 A | 9/2009 |
|---|---|---|
| EP | 1 619 224 A1 | 1/2006 |

(Continued)

OTHER PUBLICATIONS

Chinese Office Action dated Jul. 1, 2014, issued in counterpart Chinese Application No. 201310347292.1, and English-language translation thereof.

(Continued)

*Primary Examiner* — Helene Klemanski
(74) *Attorney, Agent, or Firm* — Fitzpatrick, Cella, Harper & Scinto

(57) ABSTRACT

The present invention provides an ink jet ink that is capable of recording an image excellent in light resistance and ozone resistance and has excellent intermittent ejection stability. The ink jet ink contains a coloring material and a water-soluble organic solvent. The coloring material contains a compound represented by the following general formula (I), the water-soluble organic solvent contains ethylene urea end an alkanediol having 4 to 6 carbon atoms, and a content A (% by mass) of the coloring material, a content B (% by mass) of the ethylene urea and a content C (% by mass) of the alkanediol having 4 to 6 carbon atoms based on a total mass of the ink satisfy relationships of $0.20 \leq B/A \leq 10.0$ and $0.10 \leq C/A \leq 10.0$.

(I)

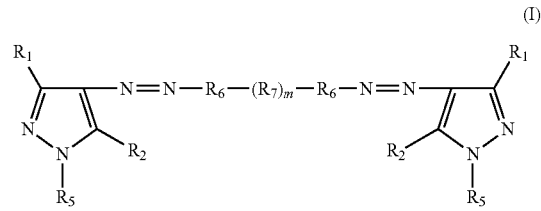

7 Claims, 2 Drawing Sheets

(56) References Cited

U.S. PATENT DOCUMENTS

| | | | | |
|---|---|---|---|---|
| 5,879,439 | A | 3/1999 | Nagai et al. | |
| 6,027,210 | A | 2/2000 | Kurabayashi et al. | |
| 6,238,045 | B1 | 5/2001 | Ono et al. | |
| 6,398,355 | B1 | 6/2002 | Shirota et al. | |
| 6,412,936 | B1 | 7/2002 | Mafune et al. | |
| 6,733,120 | B2 | 5/2004 | Ogasawara et al. | |
| 6,830,329 | B2 | 12/2004 | Iwata | |
| 6,923,855 | B2* | 8/2005 | Harada et al. | 106/31.5 |
| 6,929,362 | B2 | 8/2005 | Takada et al. | |
| 6,932,465 | B2 | 8/2005 | Nito et al. | |
| 6,935,732 | B2 | 8/2005 | Takada et al. | |
| 7,004,579 | B2 | 2/2006 | Sato et al. | |
| 7,005,461 | B2 | 2/2006 | Sanada et al. | |
| 7,008,977 | B2 | 3/2006 | Sakai et al. | |
| 7,056,972 | B2 | 6/2006 | Nakazawa et al. | |
| 7,067,590 | B2 | 6/2006 | Sato et al. | |
| 7,151,156 | B2 | 12/2006 | Sato et al. | |
| 7,160,376 | B2 | 1/2007 | Watanabe et al. | |
| 7,208,032 | B2 | 4/2007 | Hakamada et al. | |
| 7,267,717 | B2 | 9/2007 | Watanabe et al. | |
| 7,276,110 | B2 | 10/2007 | Tsujimura et al. | |
| 7,276,112 | B2 | 10/2007 | Tokuda et al. | |
| 7,291,211 | B2 | 11/2007 | Kaneko et al. | |
| 7,297,194 | B2* | 11/2007 | Shinjo et al. | 106/31.58 |
| 7,297,202 | B2 | 11/2007 | Ichinose et al. | |
| 7,297,203 | B2 | 11/2007 | Takada et al. | |
| 7,328,991 | B2 | 2/2008 | Sato et al. | |
| 7,354,145 | B2 | 4/2008 | Nito et al. | |
| 7,371,274 | B2 | 5/2008 | Sanada et al. | |
| 7,377,631 | B2 | 5/2008 | Takada et al. | |
| 7,402,200 | B2 | 7/2008 | Imai et al. | |
| 7,423,075 | B2 | 9/2008 | Ikegami et al. | |
| 7,439,282 | B2 | 10/2008 | Sato et al. | |
| 7,442,753 | B2 | 10/2008 | Tsubaki et al. | |
| 7,449,513 | B2 | 11/2008 | Sato et al. | |
| 7,498,364 | B2 | 3/2009 | Sato et al. | |
| 7,507,282 | B2 | 3/2009 | Ozawa et al. | |
| 7,510,605 | B2 | 3/2009 | Harada et al. | |
| 7,517,073 | B2 | 4/2009 | Nito et al. | |
| 7,517,074 | B2 | 4/2009 | Hakamada et al. | |
| 7,520,927 | B2 | 4/2009 | Yamakami et al. | |
| 7,528,179 | B2 | 5/2009 | Suda et al. | |
| 7,538,147 | B2 | 5/2009 | Sato et al. | |
| 7,540,910 | B2* | 6/2009 | Ogawa | 106/31.5 |
| 7,563,853 | B2 | 7/2009 | Tsubaki et al. | |
| 7,572,844 | B2 | 8/2009 | Sato et al. | |
| 7,578,585 | B2* | 8/2009 | Yamakami et al. | 347/100 |
| 7,598,332 | B2 | 10/2009 | Ikegami et al. | |
| 7,601,790 | B2 | 10/2009 | Sato et al. | |
| 7,605,192 | B2 | 10/2009 | Sanada et al. | |
| 7,629,427 | B2 | 12/2009 | Sato et al. | |
| 7,682,433 | B2 | 3/2010 | Yanagimachi et al. | |
| 7,699,924 | B2 | 4/2010 | Mafune et al. | |
| 7,704,414 | B2 | 4/2010 | Sato et al. | |
| 7,705,071 | B2 | 4/2010 | Nakagawa et al. | |
| 7,753,515 | B2 | 7/2010 | Tokuda et al. | |
| 7,771,525 | B2 | 8/2010 | Morita et al. | |
| 7,866,806 | B2 | 1/2011 | Sato et al. | |
| 7,868,060 | B2 | 1/2011 | Sakai et al. | |
| 7,878,643 | B2 | 2/2011 | Kudo et al. | |
| 7,883,199 | B2 | 2/2011 | Hakamada et al. | |
| 7,909,448 | B2 | 3/2011 | Iwata et al. | |
| 7,918,928 | B2 | 4/2011 | Saito et al. | |
| 7,988,277 | B2 | 8/2011 | Moribe et al. | |
| 8,007,097 | B2 | 8/2011 | Sanada et al. | |
| 8,013,051 | B2 | 9/2011 | Takada et al. | |
| 8,016,406 | B2 | 9/2011 | Hakamada et al. | |
| 8,016,932 | B2 | 9/2011 | Okamura et al. | |
| 8,025,722 | B2 | 9/2011 | Kawabe et al. | |
| 8,029,612 | B2 | 10/2011 | Ishii et al. | |
| 8,070,869 | B2* | 12/2011 | Wachi et al. | 106/31.5 |
| 8,123,846 | B2 | 2/2012 | Yamakami et al. | |
| 8,163,817 | B2 | 4/2012 | Nishino et al. | |
| 8,357,235 | B2* | 1/2013 | Wachi | 106/31.5 |
| 8,372,190 | B2* | 2/2013 | Tateishi et al. | 106/31.5 |
| 8,389,600 | B2 | 3/2013 | Suzuki et al. | |
| 8,393,726 | B2 | 3/2013 | Moribe et al. | |
| 8,408,691 | B2 | 4/2013 | Koike et al. | |
| 8,425,027 | B2 | 4/2013 | Nishiwaki et al. | |
| 8,450,393 | B2 | 5/2013 | Tsubaki et al. | |
| 8,469,504 | B2 | 6/2013 | Saito et al. | |
| 8,475,580 | B2 | 7/2013 | Nagai et al. | |
| 8,491,715 | B2 | 7/2013 | Gouda et al. | |
| 8,496,745 | B2 | 7/2013 | Katsumata | |
| 8,758,495 | B2* | 6/2014 | Ishida | 106/31.5 |
| 2006/0016368 | A1* | 1/2006 | Ozawa et al. | 106/31.27 |
| 2008/0152827 | A1 | 6/2008 | Hakamada et al. | |
| 2008/0199615 | A1* | 8/2008 | Harada et al. | 106/31.5 |
| 2009/0258145 | A1 | 10/2009 | Mukae et al. | |
| 2010/0034972 | A1 | 2/2010 | Mukae et al. | |
| 2011/0277663 | A1 | 11/2011 | Sanada et al. | |
| 2011/0310162 | A1 | 12/2011 | Tamanuki et al. | |
| 2012/0048143 | A1* | 3/2012 | Katsumata | 106/31.48 |
| 2012/0075393 | A1 | 3/2012 | Ishida | |
| 2012/0147083 | A1 | 6/2012 | Hayashi et al. | |
| 2012/0313997 | A1 | 12/2012 | Nakazawa et al. | |
| 2013/0271523 | A1 | 10/2013 | Sakai et al. | |
| 2013/0271540 | A1 | 10/2013 | Saito et al. | |

FOREIGN PATENT DOCUMENTS

| | | |
|---|---|---|
| EP | 1 630 204 A1 | 3/2006 |
| EP | 2 423 279 A1 | 2/2012 |
| JP | 2004-083903 A | 3/2004 |
| JP | 2007-039680 A | 2/2007 |
| JP | 2011-213845 A | 10/2011 |
| WO | 2005/075573 A1 | 8/2005 |
| WO | 2008/053776 A1 | 5/2008 |

OTHER PUBLICATIONS

Oct. 31, 2013 European Search Report in European Patent Appln. No. 13003695.7.

* cited by examiner

INK, INK CARTRIDGE AND INK JET RECORDING METHOD

BACKGROUND OR THE INVENTION

1. Field of the Invention

The present invention relates to an ink, an ink cartridge and an ink jet recording method.

2. Description of the Related Art

An ink jet recording method is such a recording method that minute droplet of an ink are applied to a recording medium such as plain paper to form an image, and is rapidly spread owing to low price of an apparatus itself and improvement of recording speed. In general, a recorded article obtained by the ink jet recording method is low in fastness properties of an image thereof compared with a silver salt photograph. In particular, when the recorded article is exposed to light, humidity, heat or environmental gas present in air, such as an ozone gas for a long period of time, there is a problem that a coloring material of the recorded article is deteriorated to easily cause change in color tone or fading of the image.

It is difficult to attain, with conventionally known coloring materials provided with Color Index (C.I.) numbers, both an optical density (color developing properties) and fastness properties of an image required of an ink jet ink, and therefore, coloring materials having novel structures are being widely studied. For example, a bisazo compound providing an image having a good optical density and excellent light resistance and ozone resistance is proposed in Japanese Patent Application Laid-Open No. 2004-083903 (Patent Document 1).

Beside, an ink containing 1,5-pentanediol and a humectant such as glycerin, ethylene glycol or ethylene urea is proposed as an ink with improved intermittent ejection stability in Japanese Patent Application Laid-Open No. 2007-039680 (Patent Document 2). Furthermore, an ink containing a specific azo compound to be a magenta coloring material, an acetylene glycol surfactant having an average addition mole number x+y of ethylene oxide groups falling in a range or $0 \le x+y \le 8.0$, and alkanediol is proposed in Japanese Patent Application Laid-Open No. 2011-213845 (Patent Document 3). The ink proposed in Patent Document 3 is described to have good intermittent ejection stability.

SUMMARY OF THE INVENTION

When one present inventors recorded an image by using the ink containing the bisazo compound described in Patent Document 1, an image having a good optical density was obtained. The light resistance and the ozone resistance of the image did not, however, reach a level demanded in recent years. Furthermore, even when 1,5-pentanediol proposed in Patent Document 2 was further added to the ink containing the bisazo compound described in Patent Document 1, on ink having sufficient performance was not obtained. Similarly, even when the specific acetylene glycol surfactant and alkanediol proposed in Patent Document 3 were added to the ink containing the bisazo compound described in Patent Document 1, an ink having performance at the level demanded in recent years was not obtained.

Accordingly, an object of the present invention is to provide an ink jet ink that is capable of recording an image excellent in light resistance and ozone resistance end has excellent intermittent election stability. Another object of the present invention is to provide an ink cartridge and an ink jet recording method using the ink.

The above-described object is achieved by the present invention as follows. Specifically, the present invention provides an ink jet ink containing a coloring material and a water-soluble organic solvent, in which the coloring material contains a compound represented by the following general formula (I), the water-soluble organic solvent contains ethylene area and an alkanediol having 4 to 6 carbon atoms, and a content A (% by mass) of the coloring material, a content B (% by mass) of the ethylene urea and a content C (% by mass) or the alkanediol having 4 to 6 carbon a atoms, based on a total mass or the ink, satisfy relationships of $0.20 \le B/A \le 10.0$ and $0.10 \le C/A \le 10.0$:

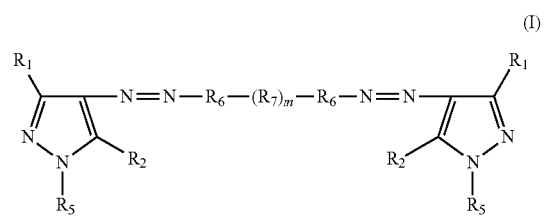

where, $R_1$ represent a monovalent group, $R_2$ represents $-OR_3$ or $-NHR_4$ (wherein $R_3$ and $R_4$ each represent a hydrogen atom or a monovalent group), $R_5$ represents an alkyl group, an aryl group or a monovalent triazine ring group, $R_6$ represents an arylene group or a divalent heterocyclic group, $R_7$ represents a divalent linking group, and m represents 0 or 1.

The present invention provides an ink jet ink that is capable of recording an image excellent in light resistance and ozone resistance and has excellent intermittent ejection stability. Besides, the present invention provides a ink cartridge and an ink jet recording method using the ink.

Further features of the present invention will become apparent from the following description of exemplary embodiments with reference to the attached drawings.

BRIEF DESCRIPTION OF THE DRAWINGS

FIGS. 2A and 2B schematically illustrate an exemplary ink jet recording apparatus used in an ink jet recording method according to the present invention, in which FIG. 2A is a perspective view illustrating a principal part of the ink jet recording apparatus, and FIG. 2B is a perspective view illustrating a head cartridge.

DESCRIPTION OF THE EMBODIMENTS

Figure 1:
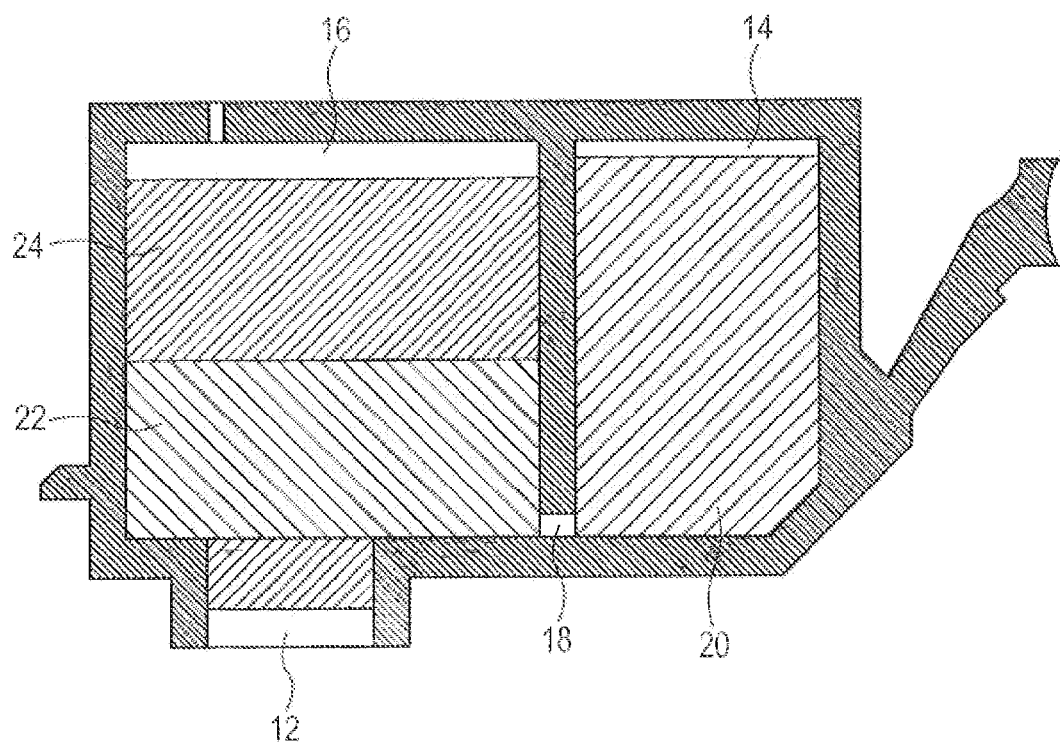
FIG. 1 is a sectional view schematically illustrating an ink cartridge according to an embodiment of the present invention.

Preferred embodiments of the present invention will now be described in detail in accordance with the accompanying drawings. Incidentally, when a compound is a salt, the salt present in an ink in a state of being dissociated into ions. In the present invention, however, this is referred to as "containing a salt" for the sake of convenience. An ink jet ink is herein sometimes designated simply as "ink".

The present inventors have found that an ink capable of recording an image excellent in light resistance and ozone resistance while satisfying intermittent ejection stability can be obtained by allowing a compound represented by the general formula (I), ethylene urea and an alkanediol having 4 to 6 carbon atoms to be contained in a prescribed ratio.

First, the intermittent ejection stability will be described. In forming an image by an ink jet recording method, if an ink is not ejected from a given election orifice of a recording head continuously for a certain period of time, water an the ink evaporates through the ejection orifice. Thereafter, when, a next droplet of the ink is to be ejected from the ejection orifice, there arises a case where the ejection of the ink becomes unstable or the ink cannot be ejected. The reason of occurrence of such a phenomenon is as follows: As the water of the ink evaporates through the ejection orifice, the concentration of a coloring material present in the ink and in the vicinity of the ejection orifice becomes relatively high. On the other hand, the concentration of the coloring material present in the ink and inside a nozzle away from the ejection orifice becomes relatively low as compared with that in the vicinity or the ejection orifice. Accordingly, a concentration gradient of the coloring material is caused between the vicinity of the ejection orifice and the inside of the nozzle. In addition, in the vicinity of the ejection orifice where the concentration of the coloring material is relatively high, since the water is reduced due to the evaporation, the ability of an aqueous medium to dissolve the coloring material is lowered, and hence the coloring material cannot keep the dissolved state thereof but is precipitated or solidified, which blocks the ejection orifice. As a result, the ink cannot be normally ejected, and therefore, the intermittent ejection stability is lowered. The compound represented by the general formula (I) used as the coloring material in the ink according to the present invention has a molecular structure for facilitating the aggregation, and hence, fastness properties of a recorded image can be improved. When the water in the ink containing such a coloring material decreases due to she evaporation in the vicinity of an ejection orifice, the ink is particularly liable to be precipitated or solidified, and the intermittent ejection stability can be easily lowered.

Since ethylene area has a moisturizing function, if an ink contains ethylene urea, the evaporation of water through as ejection orifice can be delayed as compared with a case of an ink not containing ethylene urea, and hence concentration gradient of a coloring material are minimally caused. Slight concentration gradient are, however, caused. In this case, if the ink contains a water-soluble organic solvent having low affinity with the coloring material, the concentration of the water-soluble organic solvent in the vicinity of the ejection orifice also becomes relatively high as the water evaporates. Then, the coloring material having low affinity with the water-soluble organic solvent moves from the vicinity of she ejection orifice of the recording head toward the inside of a nozzle (a common liquid chamber) where the amount water moisture is relatively large and the coloring material is likely to be in a more stably dissolved state (receding phenomenon), and hence, the coloring material is hard to be precipitated or solidified. As a result of investigation made by the present inventors, it was found that the intermittent ejection stability can be improved by using an alkanediol having 4 to 6 carbon atoms as the water-soluble organic solvent having low affinity with the compound represented by the general formula (I). When the alkanediol has 3 or less carbon atoms, the receding phenomenon is hard to be caused, and hence the intermittent ejection stability is insufficient, and when the alkanediol has 7 or more carbon atoms, the viscosity of the ink is liable to be excessively high, and hence the intermittent ejection stability is also insufficient.

Next, the light resistance and the ozone resistance will be described. Since ethylene urea has a moisturizing function as described above, if an ink contains ethylene urea, the evaporation of water from the ink having been applied onto a recording medium is delayed as compared with that of as ink not containing the ethylene urea. Furthermore, since the ethylene urea is solid at ordinary temperature (25° C.), if the evaporation of water proceeds, the ability of an aqueous medium contained in the ink to dissolve the coloring material is abruptly lowered. Besides, since the alkanediol that is hard to dissolve the compound represented by the general formula (I), namely, it acts as a poor medium for the compound represented by the general formula (I), its presence enlarges the decrease in the ability of the aqueous medium to dissolve the coloring material according to the evaporation of the water is further enhanced. Accordingly, when the evaporation of the water exceeds water retention attained by the moisturizing function of the ethylene urea, from that point of time, the compound represented by use general formula (I) is abruptly and strongly aggregated due to a combined effect of the use of the ethylene urea and the alkanediol having 4 to 6 carbon atoms in combination. It seems that a strongly aggregated state of the coloring material is caused on a recording medium owing to such a mechanism so that an image with improved light resistance and ozone resistance can be recorded. Incidentally, if the number of carbon atoms of the alkanediol is 3 or less, the action of a poor medium is so weak that the coloring material is hard to be aggregated and hence the light resistance and the ozone resistance are insufficient.

Although urea is a humectant having a higher moisturizing function than the ethylene urea, using urea instead of ethylene urea does not provides an effect of improving the light resistance and the ozone resistance. This is probably because urea has a too high moisturizing function and hence the strong aggregated state or the composed represented by the general formula (I) is hard to be caused.

In order to obtain the ink capable of recording an image excellent in the light resistance and the ozone resistance while satisfying the intermittent ejection stability by the aforementioned mechanism, it is significant to satisfy the following relationships in mass ratio between the coloring material and the ethylene urea or the alkanediol having 4 to 6 carbon atoms.

First, it is necessary for a content A (% by mass) of the compound represented by the general formula (I) (the coloring material) and a content B (% by mass) of the ethylene urea, based on a total mass of the ink, to satisfy a relationship of $0.20 \leq B/A \leq 10.0$. When the value B/A is less than 0.20, one ratio of the ethylene urea to the coloring material is too small, and therefore, the coloring material is hard to be aggregated on a recording medium, and the light resistance and the ozone resistance of a resulting image are insufficient. Furthermore, since the moisturizing function is rather low, intermittent ejection stability at an excellent level cannot be sufficiently attained in some cases. On the other hand, when the value B/A is more than 10.0, the moisturizing function of the ethylene urea is too high, and therefore, it is difficult to abruptly cause a strongly aggregated state of the coloring material, and the light resistance and the ozone resistance of a resulting image are insufficient. Furthermore, since the viscosity of the ink is liable to be high, intermittent ejection stability at an excellent level cannot be sufficiently attained in some cases.

Furthermore, it is necessary for the content A (% by mass) of the compound represented by the general, formula (I) (the coloring material) and a content C (% by mass) of the alkanediol having 4 to 6 carbon atoms, based on the total mass of the ink, to satisfy a relationship of $0.10 \leq C/A \leq 10.0$. When the value C/A is less than 0.10, the ratio of the alkanediol to the coloring material is too small, and therefore, the coloring material is hard to be aggregated on a recording medium, and the light resistance and the ozone resistance of a resulting image are insufficient. Besides, the recording phenomenon is rather difficult to occur, and therefore, intermittent ejection, stability at an excellent level cannot be sufficiently attained in some cases. On the other hand, when the value C/A is more than 10.0, the content of the alkanediol having a property of easily permeating into a recording medium, is so large that the ink easily permeates into a recording medium before the coloring material is aggregated, the light resistance and the ozone resistance of a resulting image are insufficient. Moreover, the viscosity of the ink is liable to be high, and therefore, intermittent ejection stability at an excellent lever cannot be sufficiently attained in some cases.

Ink

Now, components and physical properties of the ink according to the present invention will be described in detail.

Coloring Material: Compound Represented by the General Formula (I)

The ink according to the present invention contains a compound represented by the following general formula (I) as a coloring material (dye). The content A (% by mass) of the compound represented by the general formula (I) (coloring material) in the ink is, based on a total mass of the ink, favorably 0.1% by mass or more and 10.0% by mass or less, more favorably 2.0% by mass or more, and particularly favorably 2.5% by mass or more.

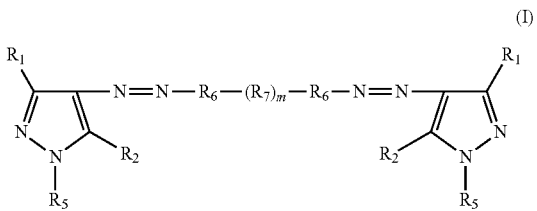

wherein, $R_1$ represents a monovalent group, $R_2$ represents $-OR_3$ or $-NHR_4$ (wherein $R_3$ and $R_4$ each represent a hydrogen atom or a monovalent group), $R_5$ represents an alkyl group, an aryl group or a monovalent triazine ring group, $R_6$ represents an arylene group or a divalent heterocyclic group, $R_7$ represents a divalent linking group, and m represents 0 or 1.

$R_1$ in the general formula (I) represents a monovalent group. Examples of the monovalent group include a halogen atom, an alkyl group, a cycloalkyl group, an aralkyl group, an alkenyl group, an alkynyl groups an aryl group, a heterocyclic group, a cyano group, a hydroxy group, a nitro group, a carboxy group (that may be of a salt form), an alkoxy group, an aryloxy group, a silyloxy group, a heterocyclic-oxy group, an acyloxy group, a carbamoyloxy group, an alkoxycarbonyloxy group, an aryloxycarbonyloxy group, an amino group, an alkylamino group, an aniline group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic-thio group, a sulfamoyl group, a sulfonic acid group (that may be of a salt form), an alkylsulfinyl group, an arylsulfinyl group, an alkylsulfonyl group, an arylsulfonyl group, an acyl group, an aryloxycarbonyl group, an alkoxycarbonyl group, a carbamoyl group, an imido group, a phosphino group, a phosphinyl group, a phosphinyloxy group, a phosphinylamino group and a silyl group.

Examples of the halogen atom include a fluorine atom, a chlorine atom, a bromine atom and an iodine atom.

The alkyl group includes a substituted or unsubstituted alkyl group. The substituted or unsubstituted alkyl group is favorably an alkyl group having 1 to 30 carbon atoms. Examples of the substituted group are the same as those described above as the specific examples of the monovalent group. Among these groups, a hydroxy group, an alkoxy group, a cyano group, a halogen atom, a sulfonic acid group (that may be of a salt form) or a carboxy group (that may be of a salt group) is favorably used. Examples of the alkyl group include a methyl group, an ethyl group, a butyl, group, a t-butyl group, as n-octyl group, an eicosyl group, a 2-chloroethyl group, a hydroxyethyl group, a cyanoethyl group, a 4-sulfobutyl group and a 4-carboxybutyl group.

The cycloalkyl group includes a substituted or unsubstituted cycloalkyl group. The substituted or unsubstituted cycloalkyl group is favorably a cycloalkyl group having 5 to 30 carbon atoms. Examples of the cycloalkyl group include a cyclohexyl group, a cyclopentyl group and a 4-n-dodecylcyclohexyl group.

The aralkyl group includes a substituted or unsubstituted aralkyl group. The substituted or unsubstituted aralkyl group is favorably an aralkyl group having 7 to 10 carbon atoms. Examples of the aralkyl group include a benzyl group and a 2-phenetyl group.

The alkenyl group includes a linear, branched or cyclic substituted or unsubstituted alkenyl group. The substituted or unsubstituted alkenyl group is favorably an alkenyl group having 2 to 30 carbon atoms. Examples of the alkenyl group include a vinyl group, an allyl group, a prenyl group, a geranyl group, an oleyl group, a 2-cyolopentene-1-yl group and a 2-cyclohexene-1-yl group.

The alkynyl group includes a substituted or unsubstituted alkynyl group. The substituted or unsubstituted alkynyl group is favorably an alkynyl group having 2 to 30 carbon atoms. Examples of the alkynyl group include an ethynyl group and a propargyl group.

The aryl group includes a substituted or unsubstituted aryl group. The substituted or unsubstituted aryl group is favorably an aryl group having 6 to 30 carbon atoms. Examples of the aryl group include a phenyl group, a p-tolyl group, a naphthyl group, an m-chlorophenyl group and an o-hexadecanoylaminophenyl group.

The heterocyclic group includes a substituted or unsubstituted monovalent group obtained by removing one hydrogen atom from an aromatic or non-aromatic heterocyclic compound. The substituted or unsubstituted heterocyclic group as favorably an aromatic 5- or 6-membered heterocyclic group having 3 to 30 carbon atoms. Examples of such an aromatic heterocyclic group include a 2-furyl group, a 2-thienyl groups a 2-pyrimidinyl group and a 2-benzothiazolyl group.

The alkoxy group includes a substituted or unsubstituted alkoxy group. The substituted or unsubstituted alkoxy group is favorably an alkoxy group having 1 to 30 carbon atoms. Examples of the alkoxy group include a methoxy group, an ethoxy group, an isopropoxy group, an n-octyloxy group, a methoxyethoxy group, a hydroxyethoxy group and a 3-carboxypropoxy group.

The aryloxy group includes a substituted or unsubstituted aryloxy group. The substituted or unsubstituted aryloxy group is favorably an aryloxy group having 6 to 30 carbon atoms. Examples of the aryloxy group include a phenoxy group, a 2-methylphenoxy group, a 4-t-butylphenoxy group, a 3-nitrophenoxy group and a 2-tetradecanoylaminophenoxy group.

The silyloxy group is favorably a silyloxy group having 3 to 20 carbon atoms. Examples of the silyloxy group include a trimethylsilyloxy group and a t-butyldimethylsilyloxy group.

The heterocyclic-oxy group includes a substituted or unsubstituted heterocyclic-oxy group. The substituted or unsubstituted heterocyclic-oxy group is favorably a heterocyclic-oxy group having 2 to 30 carbon atoms. Examples of the heterocyclic-oxy group include a 1-phenyltetrazole-5-oxy group and a 2-tetrahydropyranyloxy group.

The acyloxy group is favorably a formyloxy group, a substituted or unsubstituted alkylcarbonyloxy group having 2 to 30 carbon atoms, or a substituted or unsubstituted arylcarbonyloxy group having 6 to 30 carbon atoms. Examples of the acyloxy group include a formyloxy group, as acetyloxy group, a pivaloyloxy group, a stearoyloxy group, a benzoyloxy group and a p-methoxyphenylcarbonyloxy group.

The carbamoyloxy group includes a substituted or unsubstituted carbamoyloxy group. The substituted or unsubstituted carbamoyloxy group is favorably a carbamoyloxy group having 1 to 30 carbon atoms. Examples of the carbamoyloxy group include an N,N-dimethylcarbamoyloxy group, an N,N-diethylcarbamoyloxy group, a morphorinocarbonyloxy group, an N,N-di-n-octylaminocarbonyloxy group and a N-n-octylcarbamoyloxy group.

The alkoxycarbonyloxy group includes a substituted or unsubstituted alkoxycarbonyloxy group. The substituted or unsubstituted alkoxycarbonyloxy group is favorably an alkoxycarbonyloxy group having 2 to 30 carbon atoms. Examples of the alkoxycarbonyloxy group include a methoxycarbonyloxy group, an ethoxycarbonyloxy group, a t-butoxycarbonyloxy group and an n-octylcarbonyloxy group.

The aryloxycarbonyloxy group includes a substituted or unsubstituted aryloxycarbonyloxy group. The substituted or unsubstituted aryloxycarbonyloxy group is favorably an aryloxycarbonyloxy group having 7 to 30 carbon atoms. Examples of the aryloxycarbonyloxy group include a phenoxycarbonyloxy group, a p-methoxyphenoxycarbonyloxy group and a p-(n-hexadecyloxy) phenoxycarbonyloxy group.

The alkylamino group includes a substituted or unsubstituted alkylamino group. The substituted or unsubstituted group is favorably an alkylamino group having 1 to 30 carbon atoms. Examples of the alkylamino group include a methylamino group and a dimethylamino group.

The anilino group includes a substituted or unsubstituted aniline group. The substituted or unsubstituted aniline group is favorably an aniline group having 6 to 30 carbon atoms. Examples of the aniline group include an aniline group, an N-methylanilino group and a diphenylamino group.

The acylamino group is favorably a formylamino group, a substituted or unsubstituted alkylcarbonylamino group having 1 to 30 carbon atoms, or a substituted or unsubstituted arylcarbonylamino group having 6 to 30 carbon atoms. Examples of one acylamino group include a formylamino group, an acetylamino group, a pivaloylamino group, a lauroylamino group, a benzoylamino group and a 3,4,5-tri-n-octyloxyphenylcarbonylamino group.

The aminocarbonylamino group includes a substituted or unsubstituted aminocarbonylamino group. The substituted or unsubstituted aminocarbonylamino group is favorably an aminocarbonylamino group having 1 to 30 carbon atoms. Examples of the aminocarbonylamino group include a carbamoylamino group, an N,N-dimethylaminocarbonylamino group, an N,N-diethylaminocarbonylamino group and a morphorinocarbonylamino group.

The alkoxycarbonylamino group includes a substituted or unsubstituted alkoxycarbonylamino group. The substituted or unsubstituted alkoxycarbonylamino group is favorably an a alkoxycarbonylamino group having 2 to 30 carbon atoms. Examples of the alkoxycarbonylamino group include a methoxycarbonylamino group, an ethoxycarbonylamino group, a t-butoxycarbonylamino group, an n-octadecyloxycarbonylamino group and an N-methyl-methoxycarbonylamino group.

The aryloxycarbonylamino group includes a substituted or unsubstituted aryloxycarbonylamino group. The substituted or unsubstituted aryloxycarbonylamino group is favorably an aryloxycarbonylamino group having 7 to 30 carbon atoms. Examples of the aryloxycarbonylamino group include a phenoxycarbonylamino group, a p-chlorophenoxycarbonylamino group and an m-(n-octyloxy)phenoxycarbonylamino group.

The sulfamoylamino group includes a substituted or unsubstituted sulfamoylamino group. The substituted or unsubstituted sulfamoylamino group is favorably a sulfamoylamino group having 0 to 30 carbon atoms. Examples of the sulfamoylamino group include a sulfamoylamino group, an N,N-dimethylaminosulfonylamino group and an N,N-octylaminosulfonylamino group.

The alkylsulfonylamino group includes a substituted or unsubstituted alkylsulfonylamino group. The substituted or unsubstituted alkylsulfonylamino group is favorably an alkylsulfonylamino group having 1 to 30 carbon atoms. Examples of the alkylsulfonylamino group include a methylsulfonylamino group and a butylsulfonylamino group.

The arylsulfonylamino group includes a substituted or unsubstituted arylsulfonylamino group having 6 to 30 carbon atoms. The substituted or unsubstituted arylsulfonylamino group is favorably an arylsulfonylamino group having 6 to 30 carbon atoms. Examples of the arylsulfonylamino group include a phenylsulfonylamino group, a 2,3,5-trichlorophenylsulfonylamino group and a p-methylphenylsulfonylamino group.

The alkylthio group includes a substituted or unsubstituted alkylthio group. The substituted or unsubstituted alkylthio group is favorably an alkylthio group having 1 to 30 carbon atoms. Examples of the alkylthio group include a methylthio group; an ethylthio group and an n-hexadecylthio group.

The arylthio group includes a substituted or unsubstituted arylthio group. The substituted or unsubstituted arylthio group is favorably an arylthio group having 6 to 30 carbon atoms. Examples of the arylthio group include a phenylthio group, a p-chlorophenylthio group and an m-methoxyphenylthio group.

The heterocyclic-thio group includes a substituted or unsubstituted heterocyclic-thio group. The substituted or unsubstituted heterocyclic-thio group is favorably a heterocyclic-thio group having 2 to 10 carbon atoms. Examples or the heterocyclic-thio group include a 2-benzothiazolylthio group and a 1-phenyltetrazole-5-ylthio Group.

The sulfamoyl group includes a substituted or unsubstituted sulfamoyl group. The substituted or unsubstituted sulfamoyl group is favorably a sulfamoyl group having 0 to 30 carbon atoms. Examples of the sulfamoyl group include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group and as N—(N'-phenylcarbamoyl)sulfamoyl group.

The alkylsulfinyl group includes a substituted or unsubstituted alkylsulfinyl group. The substituted or unsubstituted alkylsulfinyl group is favorably an alkylsulfinyl group having 1 to 30 carbon atoms. Examples of the alkylsulfinyl group include a methylsulfinyl group and an ethylsulfinyl group.

The arylsulfinyl group includes a substituted or unsubstituted arylsulfinyl group. The substituted or unsubstituted arylsulfinyl group is favorably as arylsulfinyl group having a 6 to 30 carbon a atoms. Examples of the arylsulfinyl group include a phenylsulfinyl group and a p-methylphenylsulfinyl group.

The alkysulfonyl group includes a substituted or unsubstituted alkylsulfonyl group. The substituted or unsubstituted alkylsulfonyl is favorably an alkylsulfonyl group having 1 to 30 carbon atoms. Examples of the alkylsulfonyl group include a methylsulfonyl group and an ethylsulfonyl group.

The alkylsulfonyl group includes a substituted or unsubstituted arylsulfonyl group. The substituted or unsubstituted arylsulfonyl group is favorably an arylsulfonyl group having 6 to 30 carbon atoms. Examples of the arylsulfonyl group include a phenylsulfonyl group and a p-methylphenylsulfonyl group.

The acyl group is favorably a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 4 to 30 carbon atoms and bonded to a carbonyl group via a carbon atom. Examples of the acyl group include an acetyl, group, a pivaloyl group, a 2-chloroacetyl group, a stearoyl group, a benzoyl group, a p-(n-octyloxy)phenylcarbonyl group, a 2-pyridylcarbonyl group and a 2-furylcarbonyl group.

The aryloxycarbonyl group includes a substituted or unsubstituted aryloxycarbonyl group. The substituted or unsubstituted aryloxycarbonyl group is favorably an aryloxycarbonyl group having 7 to 30 carbon atoms. Examples of the aryloxycarbonyl group include a phenoxycarbonyl group, an o-chlorophenoxycarbonyl group, an m-nitrophenoxycarbonyl group and a p-(t-butyl)phenoxycarbonyl group.

The alkoxycarbonyl group includes a substituted or unsubstituted alkoxycarbonyl group. The substituted or unsubstituted alkoxycarbonyl group is favorably an alkoxycarbonyl group having 2 to 30 carbon atoms. Examples of the alkoxycarbonyl group include a methoxycarbonyl group, an ethoxycarbonyl group, a t-butoxycarbonyl group and an n-octadecyloxycarbonyl group.

The carbamoyl group includes a substituted or unsubstituted carbamoyl group. The substituted or unsubstituted carbamoyl group is favorably a carbamoyl group having 1 to 30 carbon atoms. Examples of the carbamoyl group include a carbamoyl group, an N-methylcarbamoyl group, an N,N-dimethylcarbamoyl group, an N,N-di-n-octylcarbamoyl group and an N-(methylsulfonyl)carbamoyl group.

The imide group includes a substituted or unsubstituted imide group. The substituted or unsubstituted imide group is favorably an imide group having 4 to 30 carbon atoms. Examples of the imide group include a succinimide group, a phthalimide group, a glutarimide group and a hexanimide group.

The phosphino group includes a substituted or unsubstituted phosphino group. The substituted or unsubstituted phosphino group is favorably a phosphino group having 2 to 30 carbon atoms. Examples of the phosphino group include a dimethylphosphino group, a diphenylphosphino group and a methylphenoxyphosphino group.

The phosphinyl group includes a substituted or unsubstituted phosphinyl group. The substituted or unsubstituted phosphinyl group is favorably a phosphinyl group having 2 to 30 carbon atoms. Examples of the phosphinyloxy group include a phosphinyl group, a dioctyloxyphosphinyl group and a diethoxyphosphinyl group.

The phosphinyloxy group includes a substituted or unsubstituted phosphinyloxy group. The substituted or unsubstituted phosphinyloxy group is favorably a phosphinyloxy group having 2 to 30 carbon atoms. Examples of the phosphinyloxy group include a diphenoxyphosphinyloxy group and a dioctyloxyphosphinyloxy group.

The phosphinylamino group includes a substituted or unsubstituted phosphinylamino group. The substituted or unsubstituted phosphinylamino group is favorably a phosphinylamino group having 2 to 30 carbon atoms. Examples of the phosphinylamino group include a dimethoxyphosphinylamino group and a dimethylaminophosphinylamino group.

The silyl group includes a substituted or unsubstituted silyl group. The substituted or unsubstituted silyl group is favorably a silyl group having 3 to 30 carbon atoms. Examples of the silyl group include a trimethylsilyl group, a t-butyldimethylsilyl group and a phenyldimethylsilyl group.

Regarding the aforementioned monovalent groups that has a hydrogen atom, the hydrogen atom may be substituted with any of the aforementioned monovalent groups. Examples of such a substituent include an alkylcarbonylaminosulfonyl group, an arylcarbonylaminosulfonyl group, an alkylsulfonylaminocarbonyl group and an arylsulfonylaminocarbonyl group. Specific examples of these substituents include a methylsulfonylaminocarbonyl group, a p-methylphenylsulfonylaminocarbonyl group, an acetylaminosulfonyl group and a benzoylaminosulfonyl group.

$R_2$ in the general formula (I) represents $-OR_3$ or $-NHR_4$. Besides, $R_3$ and $R_4$ each represent a hydrogen atom or a monovalent group. Examples of this monovalent group are the same as those described above as the examples, including the favorable examples, of the monovalent group represented by $R_1$. $R_2$ favorably represents $-OH$ or $-NH_2$ and more favorably $-NH_2$.

$R_5$ in the general formula (I) represents an alkyl group, an aryl group or a monovalent triazine ring group. The alkyl group represented by $R_5$ includes a substituted or unsubstituted alkyl group. Examples of the alkyl group represented by $R_5$ are the same as those described above as the examples, including the favorable examples, of the alkyl group of the monovalent groups represented by $R_1$. The aryl group represented by $R_5$ includes a substituted er unsubstituted aryl group. Examples of the aryl group represented by $R_5$ are the same as those described above as the examples, including the favorable examples, of the aryl group of the monovalent groups represented by $R_1$. The monovalent triazine ring group represented by $R_5$ includes a substituted or unsubstituted triazine ring group. Incidentally, if each group of $R_5$ has a substituent, examples of the substituent see the same as those described above as the examples, including the favorable examples, of the monovalent groups represented by $R_1$.

$R_6$ in the general formula (I) represents an arylene group or a divalent heterocyclic group. The arylene group represented by $R_6$ includes a substituted or unsubstituted arylene group. The substituted or unsubstituted arylene group is favorably an arylene group having 6 to 30 carbon atoms. Examples of the substituent are the same as those described, above as the examples of the monovalent group represented by $R_1$. Examples of the arylene group include a phenylene group and a naphthylene group.

The divalent heterocyclic group represented by $R_6$ can be a 5-membered ring or a 6-membered ring. The divalent heterocyclic group may be further fused, or may be an aromatic heterocyclic or a non-aromatic heterocycle. In general, heterocyclic groups can be classified into type I and type II. A heterocyclic group of type I is known as an acidic nucleus. Examples of the heterocyclic group of type I include a 5-pyrazolone ring group, a 5-aminopyrazole ring group, an oxazolone ring group, a barbiturate ring group, a pyridone ring group, a rhodanine ring group, a pyrazolidinedione ring group, a pyrazolopyridone ring group and a meldrum's acid ring group. Among these ring groups, a 5-pyrazolone ring group and a 5-aminopyrazole ring group are favorable. A heterocyclic group of type II is known as a basic nucleus. Examples of the heterocyclic group of type II include a pyridine group, a pyrazine group, a pyramiding group, a pyridazine group, a triazine group, a quinoline group, an isoquinoline group, a quinazoline group, a cinnoline group, a phthalazine group, a quinoxaline group, a pyrrole group, an indole group, a furan group, a benzfuran group, a thiophene group, a benzothiophene group, a pyrazole group, an imidazole group, a benzimidazole group, a triazole group, an oxazole group, a benzoxazole group, a thiazole group, a benzothiazole group, an isothiazole group, a benzoisothiazole group, a thiadiazole group, an isoxazole group, a benzisoxazole group, a pyrrolidine group, a piperidine group, a piperazine group, an imidazolidine group and a thiazoline group. Among these groups, aromatic heterocyclic groups are favorable, and a pyridine group, a pyrazine group, a pyramiding group, a pyridazine group, a triazine group, a pyrazole group, an imidazole group, a benzimidazole group, a triazole group, a thiazole group, a benzthiazole group, an isothiazole group, a benzisothiazole group and a thiadiazole group are more favorable, and from the viewpoint of the light resistance, a thiadiazole group is particularly favorable. The divalent heterocyclic group may have a substituent. Examples of the substituent are the same as those described above as the examples or the monovalent group represented by $R_1$.

$R_7$ in the general formula (I) represents a divalent linking group, and m represents 0 or 1. If m is 0, it means that the compound has a structure including two substituents $R_6$ bonded to each other.

Examples of the divalent linking group represented by $R_7$ include an alkylene group such as a methylene group, an ethylene group, a propylene group, a butylene group or a pentylene group; an alkenylene group such as an ethenylene group or a propenylene group; an alkynyl one group such as an ethynylene group or a propynylene group; an arylene group such as a phenylene group or a naphthylene group; a divalent heterocyclic group such as a 6-chloro-1,3,5-triazine-2,4-diyl group, a pyramiding-2,4-diyl group or a quinoxaline-2,3-diyl group; —O—; —CO—; —$NR_9$— (wherein $R_9$ represents a hydrogen atom, an alkyl group or an aryl group); —S—; —$SO_2$—; —SO—; and combinations of these.

The alkylene group, the alkenylene group, the alkynylene group, the arylene group, the divalent heterocyclic group, and the alkyl group and the aryl group represented by $R_9$ all may have a substituent. Examples of the substituent are the same as those described above as the examples of the monovalent group represented by $R_1$. Examples of the alkyl group and the aryl group represented by $R_9$ are the same as those described above as the examples, including the favorable examples, of the alkyl group and the aryl group of the monovalent groups represented by $R_1$.

$R_7$ in the general formula (I) more favorably represents an alkylene group having 10 or less carbon atoms, an alkenylene group having 10 or less carbon atoms, an alkynylene group having 10 or less carbon atoms, an arylene group having 6 to 10 carbon atoms, a divalent heterocyclic group, —O—, —S—, or a combination of any of these. Especially, $R_7$ particularly favorably represents a combination of —S— and an alkylene group from the viewpoint of stability of the compound represented by the general formula (I).

The total carbon number of the divalent linking group represented by $R_7$ is favorably 0 to 50, more favorably 0 to 30, and particularly favorably 0 to 10.

Among the compounds represented by the general formula (I), a compound represented by the following general formula (II) is favorable.

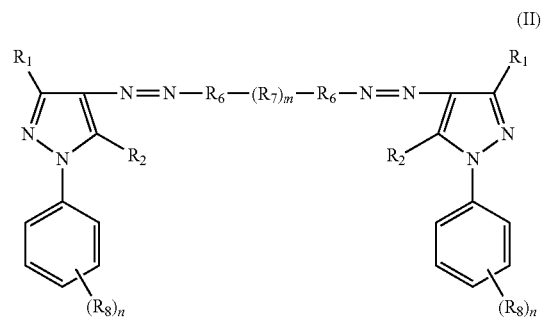

(II)

In the general formula (II), $R_1$ represents a monovalent group, and $R_2$ represents —$OR_3$ or —$NHR_4$ (wherein $R_3$ and $R_4$ each represent a hydrogen atom or a monovalent group). $R_6$ represents an arylene group or a divalent heterocyclic group, $R_7$ represents a divalent linking group, and m represents 0 or 1. $R_8$ represents an ionic group, and n represents 1 or 2.

$R_1$ to $R_4$, $R_6$ add $R_7$ in the general formula (II) have the same meaning as defined above as $R_1$ to $R_4$, $R_6$ and $R_7$ in the general formula (I), and the favorable groups and combinations thereof are the same as those described with regard to $R_1$ to $R_4$, $R_6$ and $R_7$ in the general formula (I). In the general formula (II), the ionic group represented by $R_8$ may be of a salt form. Examples of the ionic group include a carboxy group, a sulfonic acid group, a phosphate group and a phosphonic acid group. Examples of a counter ion used for forming a salt include an alkali metal; ammonium ($NH_3$); and a cation of organic ammonia or the like. Examples of the alkali metal include lithium, sodium and potassium. Examples of the organic ammonium include alkylamines having 1 to 3 carbon atoms such as methylamine and ethylamine; and mono-, di- or trialkanolamines having 1 to 4 carbon atoms such as monoethanolamine, diethanolamine, triethanolamine, monoisopropanolamine, diisopropanolamine and triisopropanolamine. Incidentally, also when the compound represented by the general formula (I) has an ionic group as a monovalent group or a substituent, the ionic group may be of a salt form similarly to $R_8$, and examples of a counter ion used in this case are the same as the cations described above.

It is particularly favorable, in the present invention, that the compound represented by the general formula (I) has a structure in which $R_2$ is favorably an amino group, $R_6$ is favorably a heterocyclic group and more favorably a thiadiazole group, and $R_7$ is favorably an alkylene group or an alkylene group having a hetero atom, and more favorably an alkylene group having a hetero atom.

Favorable examples on the compound represented by the general formula (I), expressed in terms of a free acid form, include exemplified compounds 1 to 41 below. Needless to say, the compound of the present invention is not limited to these exemplified compounds so far as the compound is encompassed in the structure and the definition of the general formula (I). In the present information, among these exemplified compounds, the exemplified compounds 10 to 22, 27 to 31, 33, 34 and 41 are favorable, and the exemplified compound 11 is more favorable.

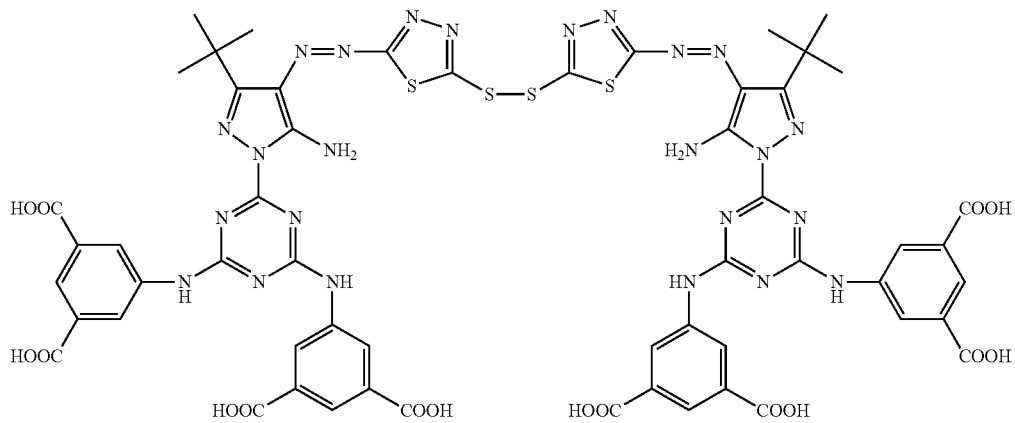
Exemplified Compound 1
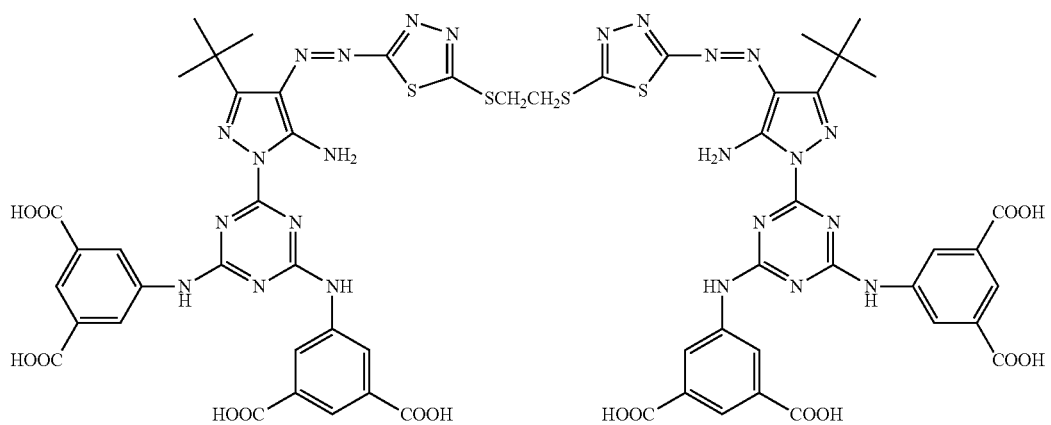
Exemplified Compound 2
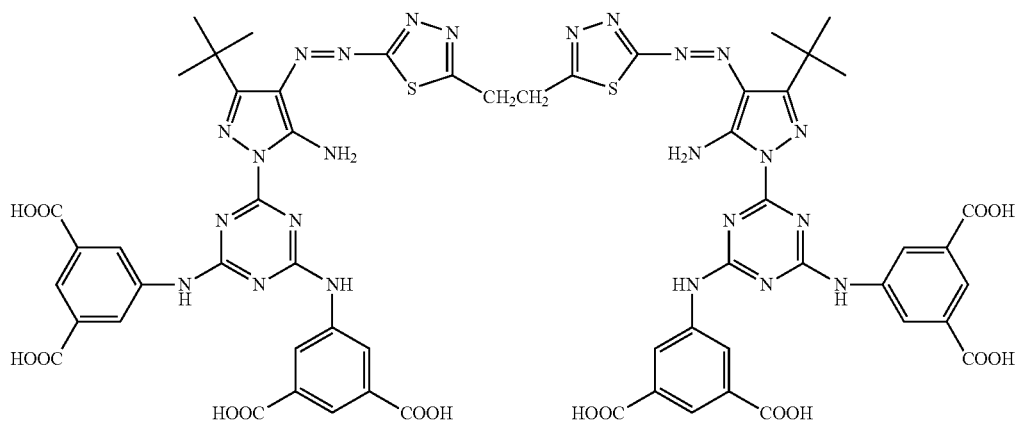
Exemplified Compound 3

Exemplified Compound 4
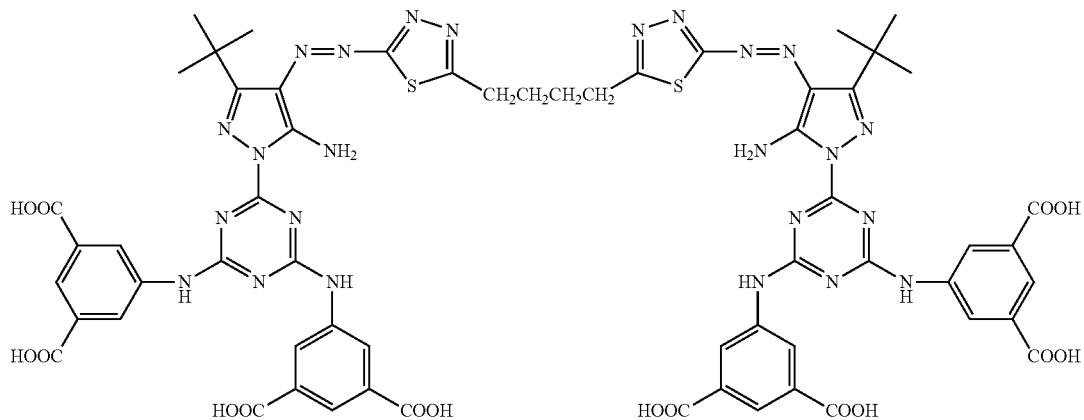
Exemplified Compound 5
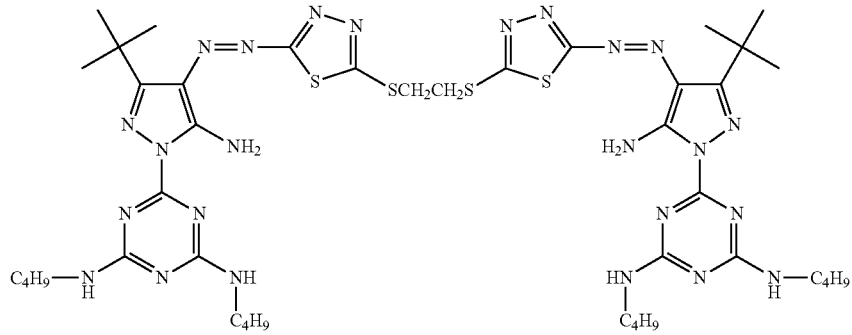
Exemplified Compound 6
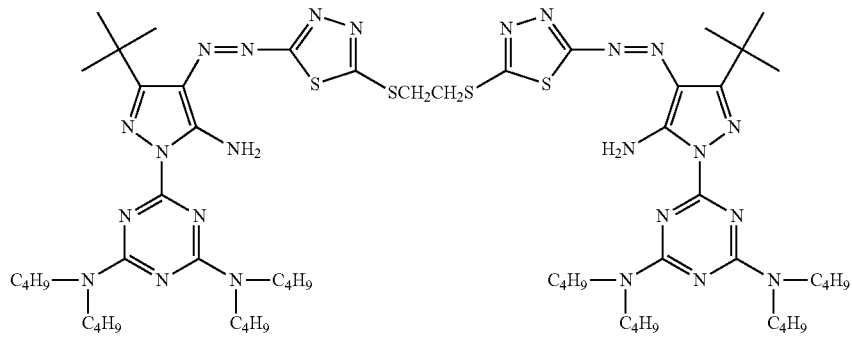
Exemplified Compound 7
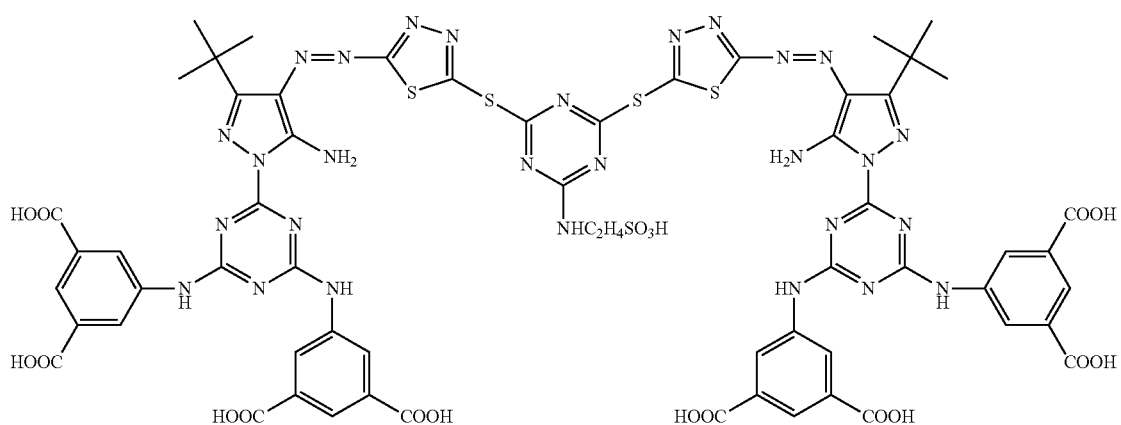

-continued
Exemplified Compound 8
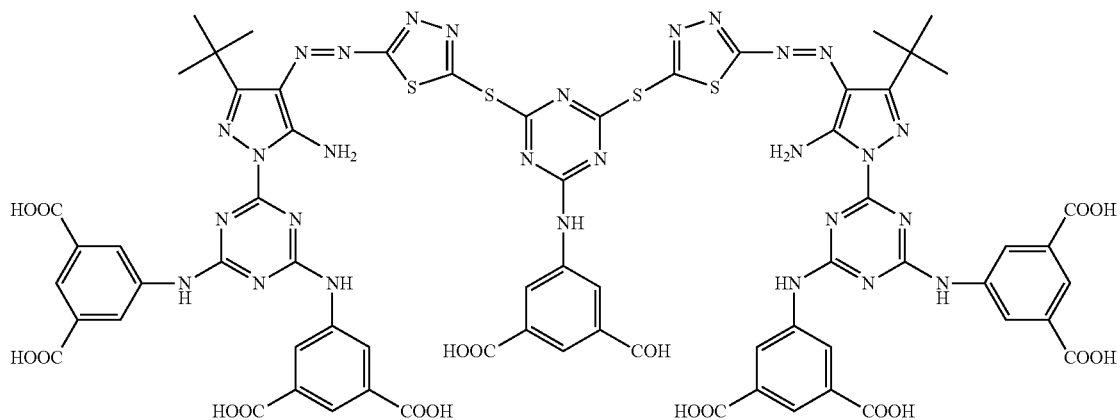
Exemplified Compound 9
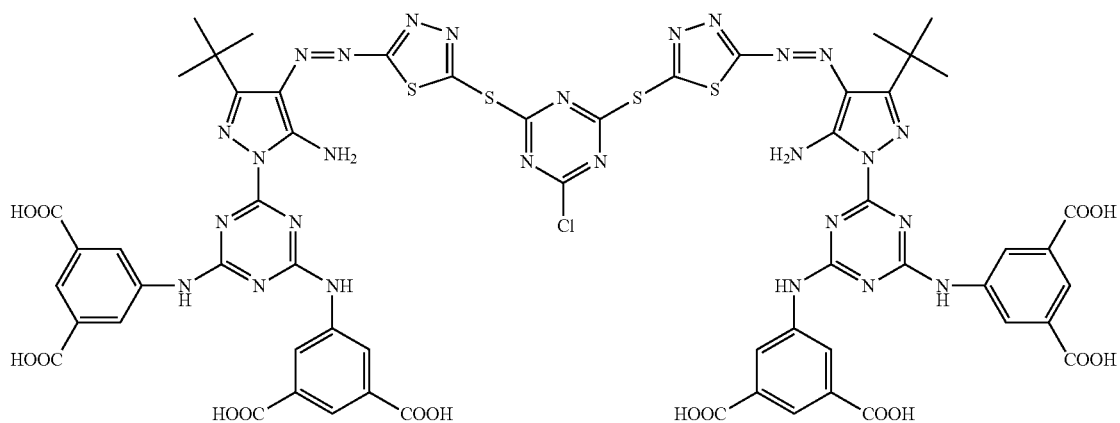
Exemplified Compound 10
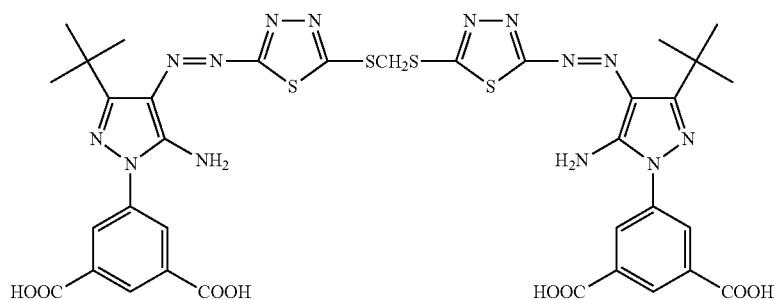
Exemplified Compound 11
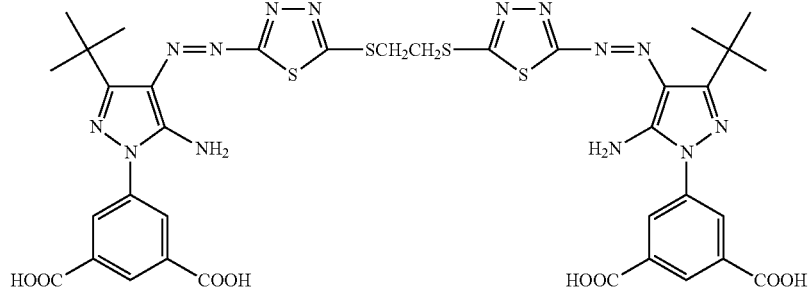

-continued
Exemplified Compound 12
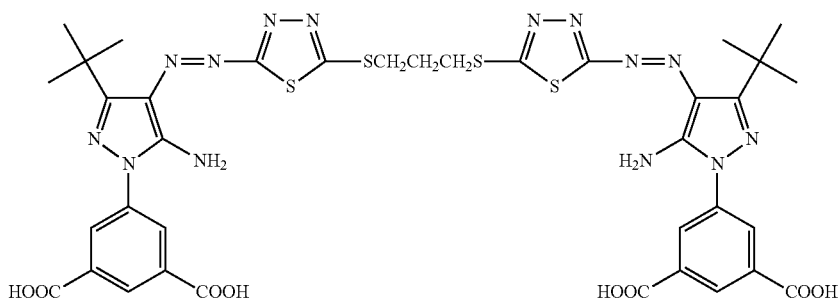
Exemplified Compound 13
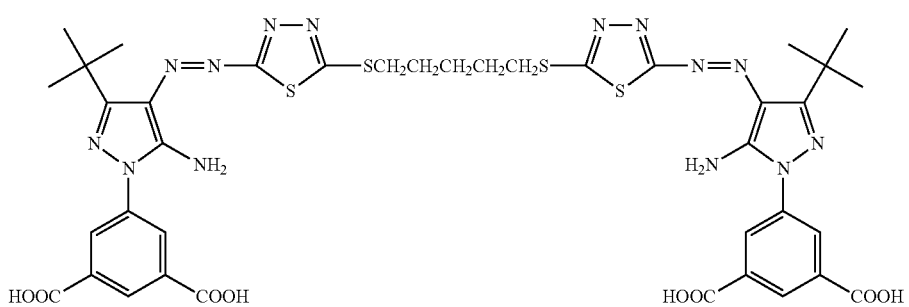
Exemplified Compound 14
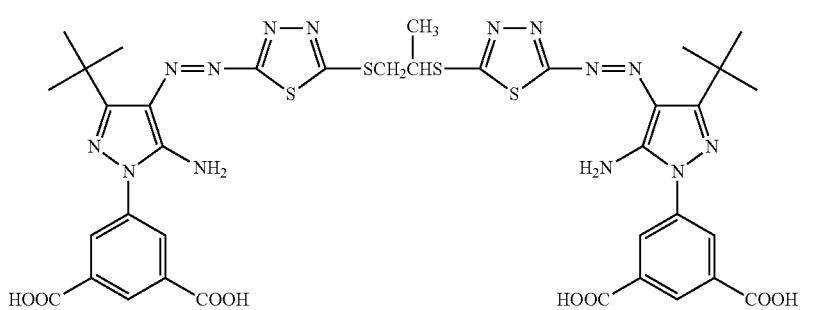
Exemplified Compound 15
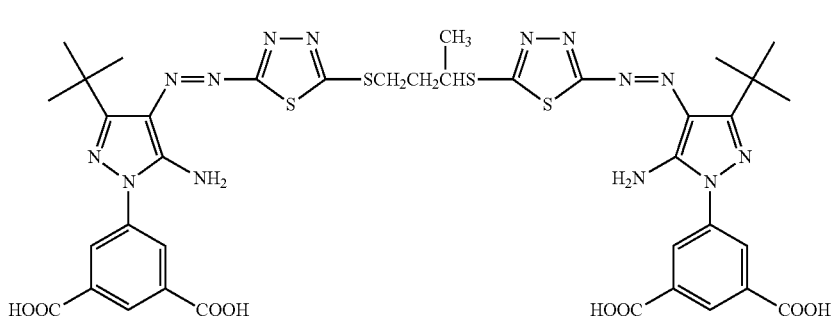
Exemplified Compound 16
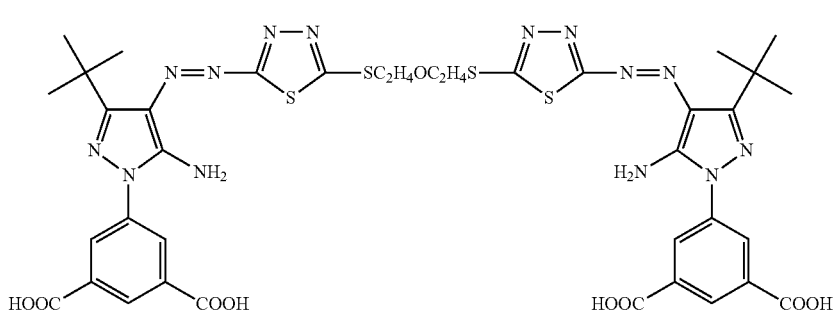

-continued
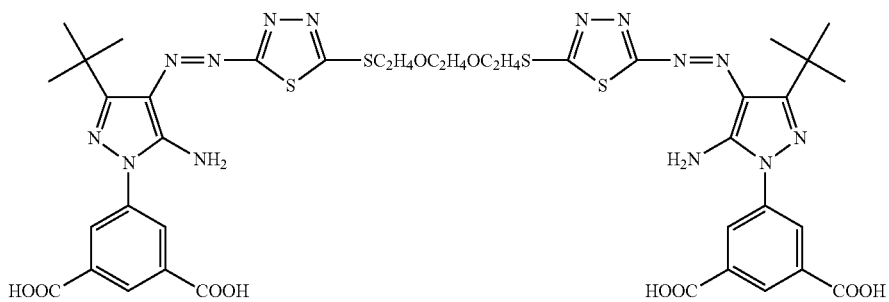
Exemplified Compound 17
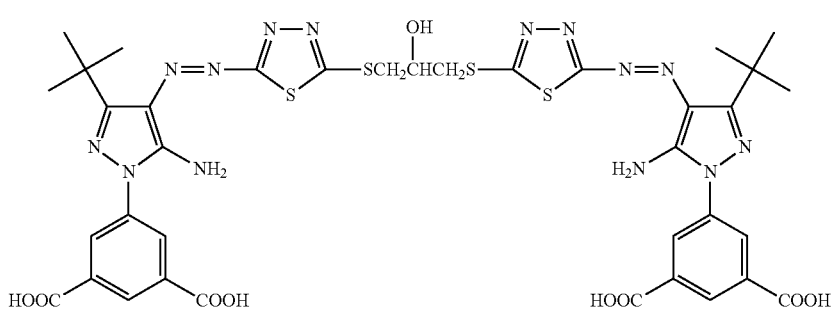
Exemplified Compound 18
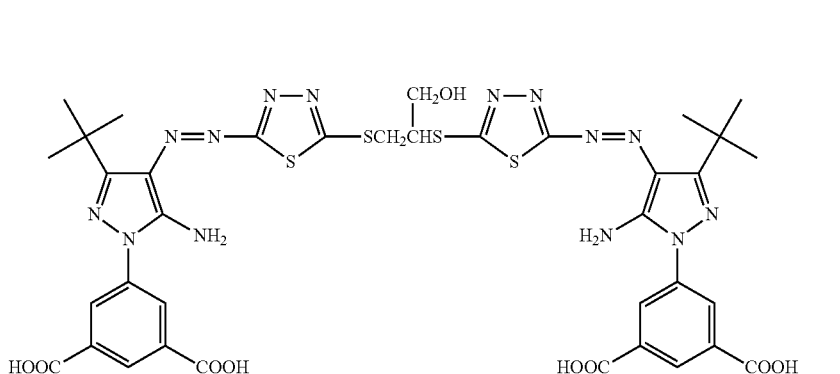
Exemplified Compound 19
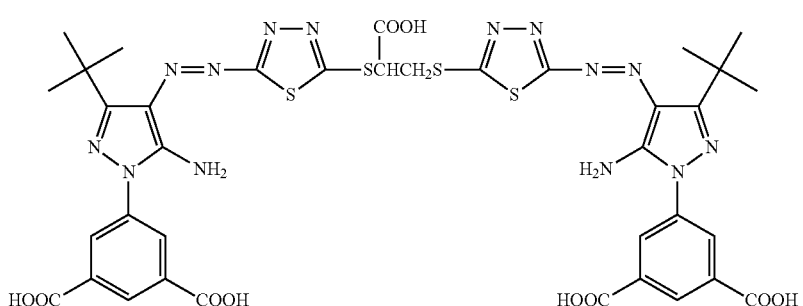
Exemplified Compound 20
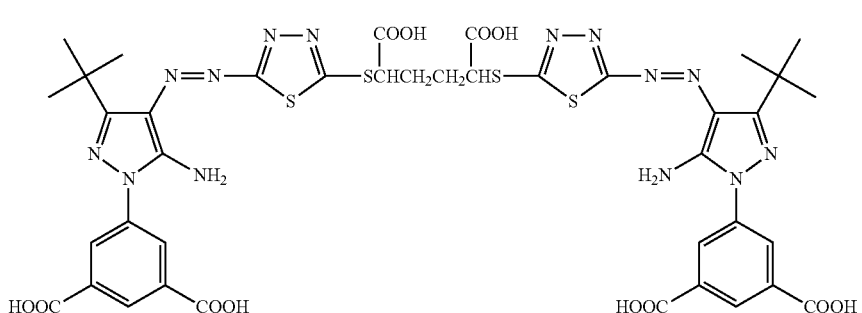
Exemplified Compound 21

-continued
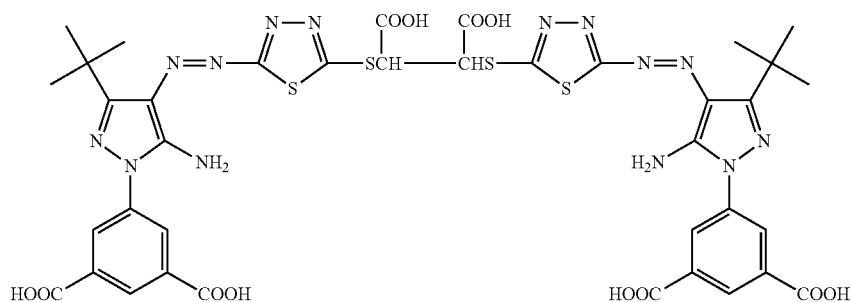
Exemplified Compound 22
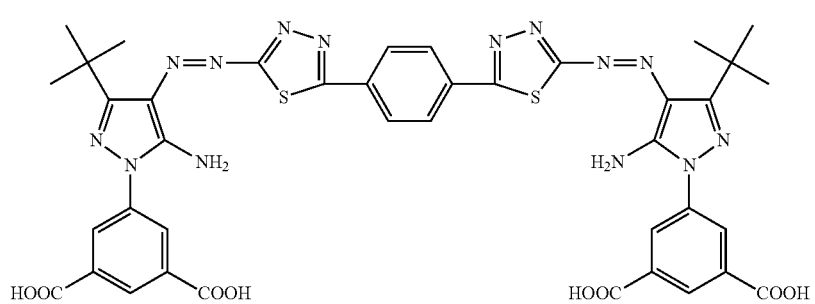
Exemplified Compound 23
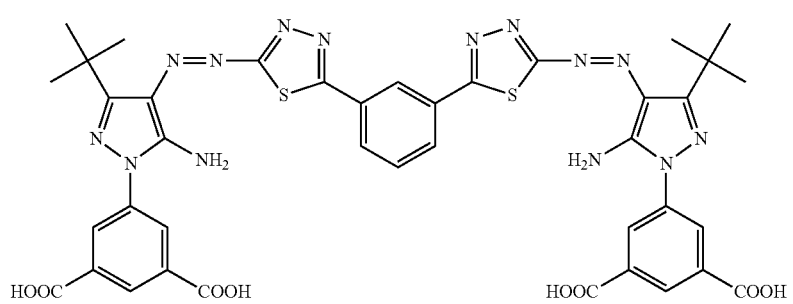
Exemplified Compound 24
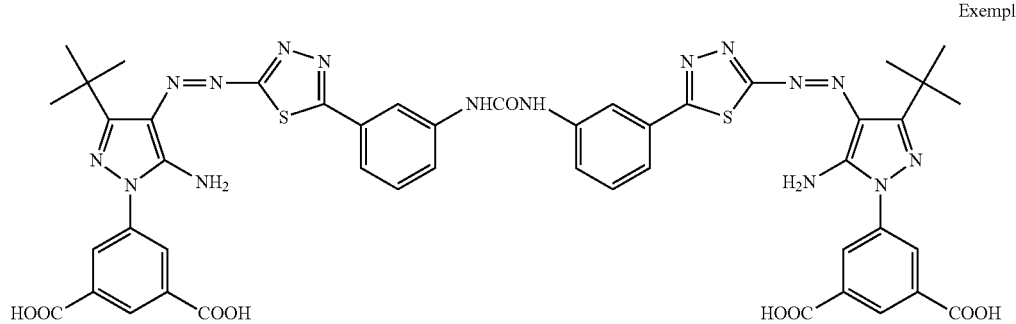
Exemplified Compound 25
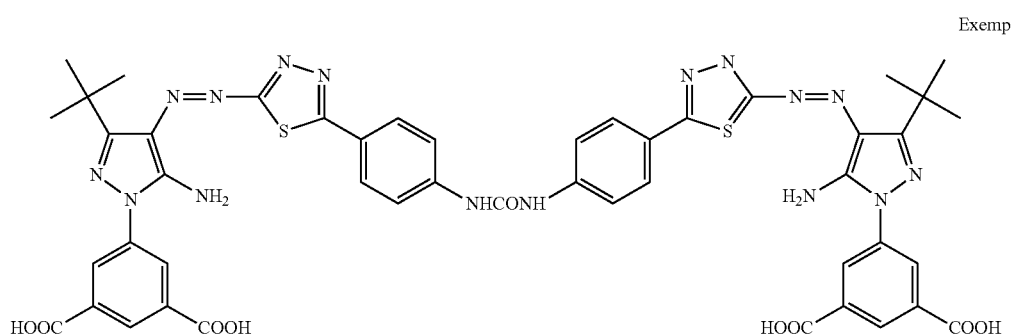
Exemplified Compound 26

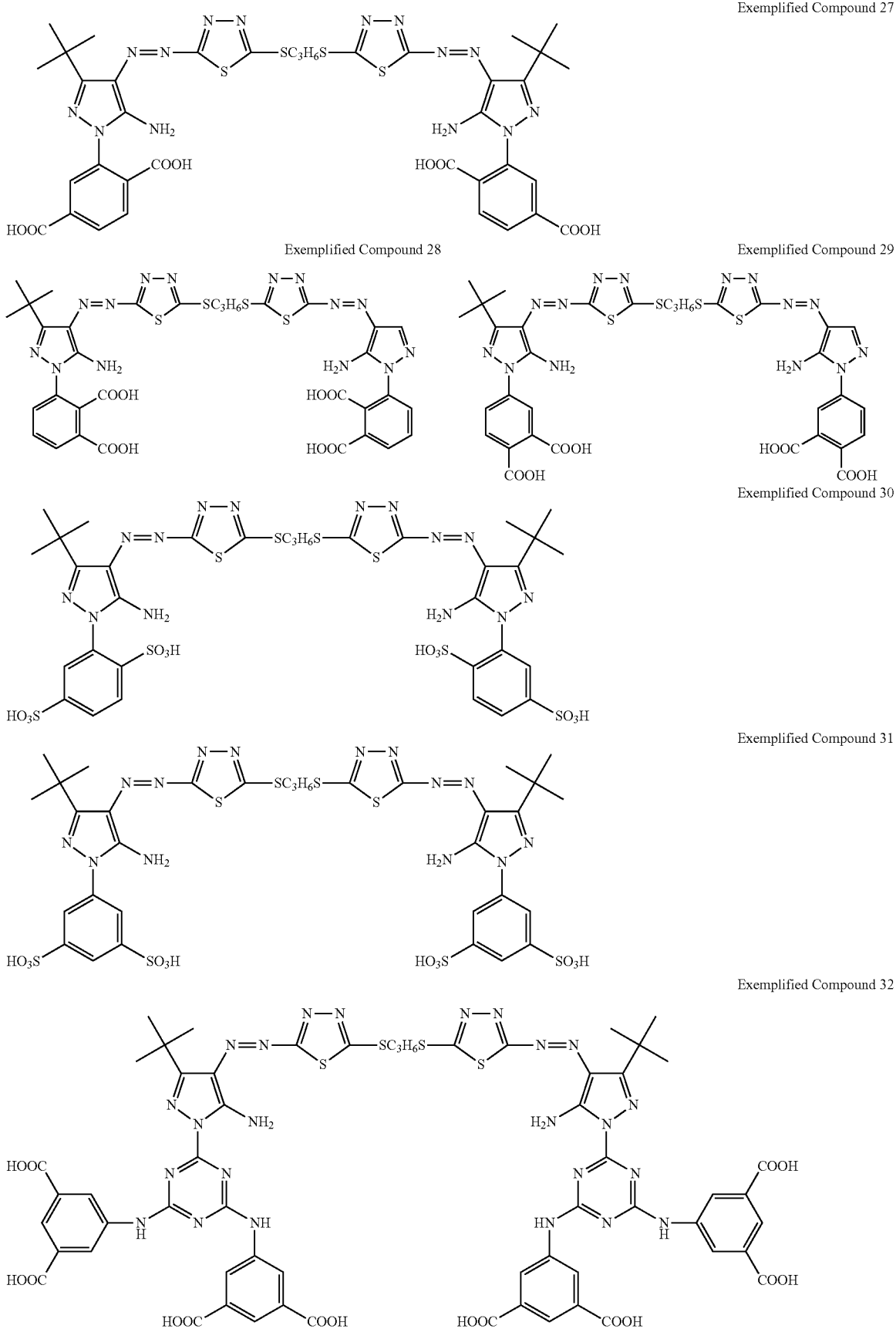

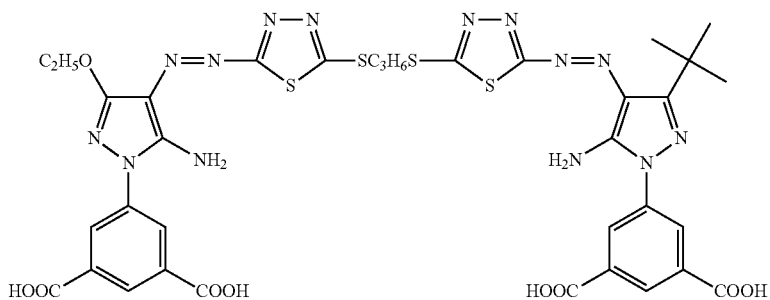
Exemplified Compound 33
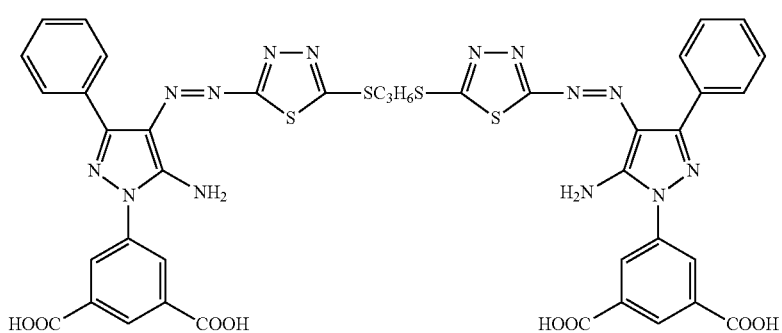
Exemplified Compound 34
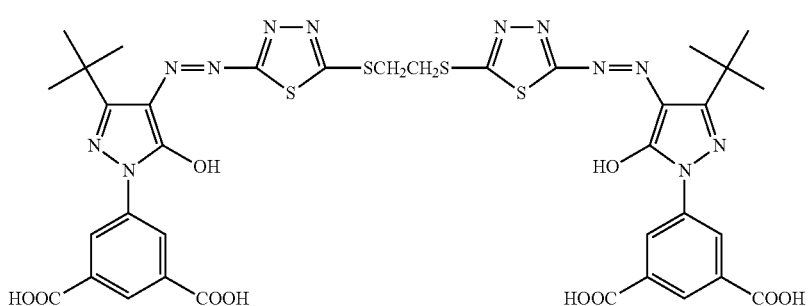
Exemplified Compound 35
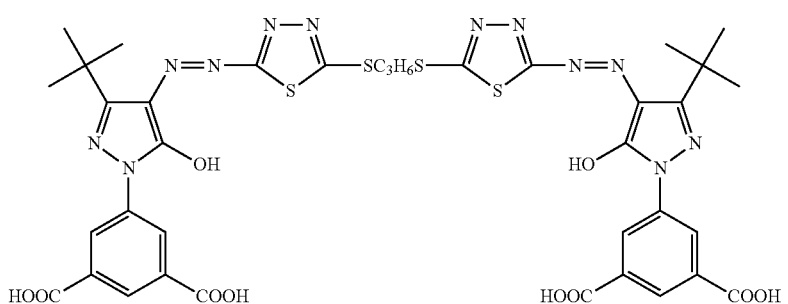
Exemplified Compound 36
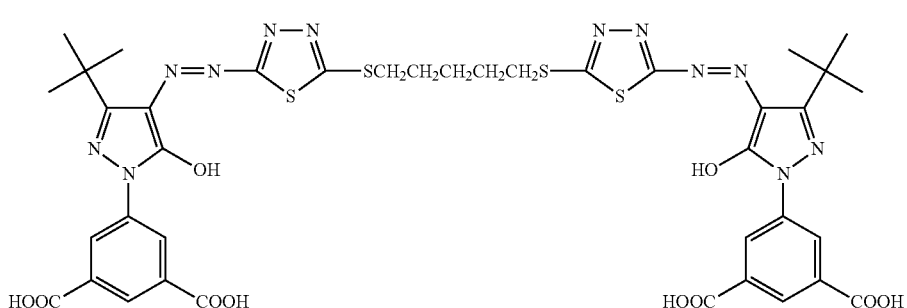
Exemplified Compound 37

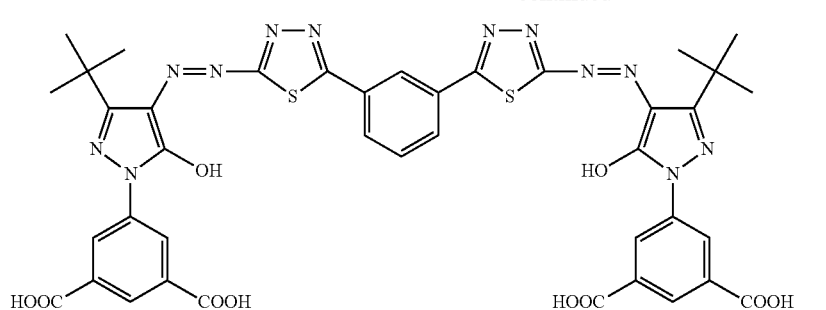

Exemplified Compound 38

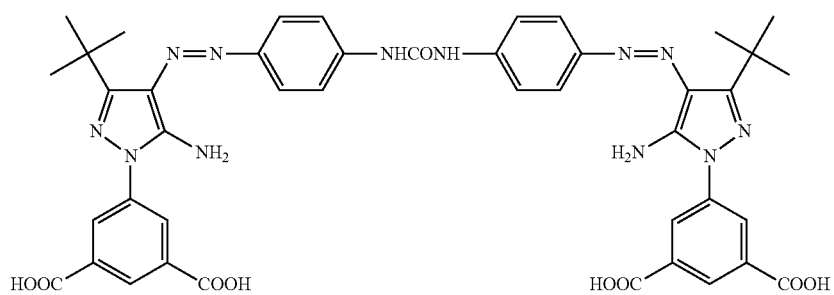

Exemplified Compound 39

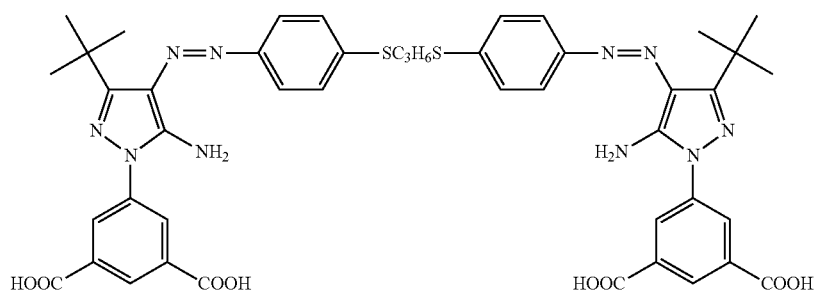

Exemplified Compound 40

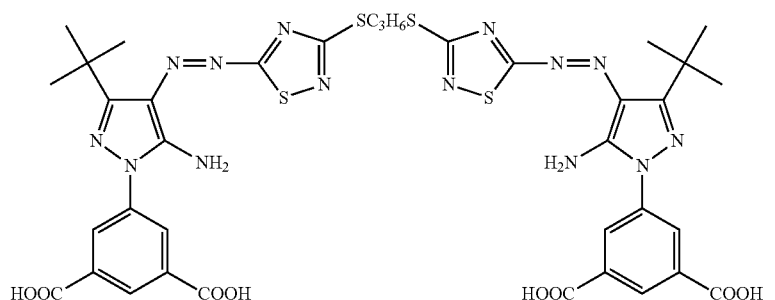

Exemplified Compound 41

Verification Method of Coloring Material

In order to verify whether the coloring material (compound represented by the general formula (I)) used in the present invention is contained in the ink or not, the following verification methods (1) to (3) using high performance liquid chromatography (HPLC) can be applied.
(1) Retention time of a peak
(2) Maximum absorption wavelength for the peak in (1)
(3) M/Z (posi) and M/Z (nega) of a mass spectrum for the peak in (1)

The analysis conditions of high performance liquid chromatography are as described below. A liquid (ink) diluted with pure water about 1,000-fold is used as a sample for measurement. Then, analysis by high performance liquid chromatography is performed under the following conditions to measure the retention time of a peak and the maximum absorption wavelength for the peak.

Column: Sunfire C18 (manufactured by Nihon Waters K. K.) 2.1 mm×150 mm

Column temperature: 40° C.

Flow rate: 0.2 mL/min

PDA: 200 nm to 700 nm

Mobile phases and gradient conditions: Table 1

TABLE 1

| Mobile Phase and Gradient Conditions | | | | |
|---|---|---|---|---|
| | 0-5 min. | 5-24 min. | 24-31 min. | 31-45 min. |
| A: Water | 85% | 85 → 45% | 45 → 0% | 0% |
| B: Methanol | 10% | 10 → 50% | 50 → 95% | 95% |

TABLE 1-continued

| Mobile Phase and Gradient Conditions | | | | |
|---|---|---|---|---|
| | 0-5 min. | 5-24 min. | 24-31 min. | 31-45 min. |
| C: 0.2 mol/L ammonium acetate aqueous solution | 5% | 5% | 5% | 5% |

In addition, conditions for the analysis of the mass spectrum are as described below. The mass spectrum for the resultant peak is measured under the following conditions, and then the most strongly detected M/Z is measured for each of 'posi' and 'nega'.

Ionization method: ESI
Capillary voltage: 3.5 kV
Desolvation gas: 300° C.
Ion source temperature: 120° C.
Detectors:
posi; 40V 200 to 1,500 amu/0.9 sec
nega; 40V 200 to 1,500 amu/0.9 sec Exemplified Compound 11 as a specific example of the compound represented by the general formula (I) was subjected to the measurement by the method and under the conditions. Table 4 shows values for the retention time, maximum absorption wavelength, M/Z (posi), and M/Z (nega) obtained as a result of the measurement. When an unknown ink is subjected to the measurement by the same method and under the same conditions as the foregoing, and the resultant measured values correspond to the values shown in Table 4, the ink can be judged to contain the compound represented by the general formula (I) to be used in the ink of the present invention.

TABLE 2

| Measurement Results | | | | |
|---|---|---|---|---|
| | Retention Time (min) | Maximum Absorption Wavelength (nm) | M/Z posi | M/Z nega |
| Exemplified Compound 11 | 35.0-36.0 | 425-430 | 920-923 | 918-921 |

Ethylene Urea

The water-soluble organic solvent to be contained in the ink according to the present invention in includes ethylene area. Although ethylene urea is solid at ordinary temperature (25° C.), an aqueous solution containing ethylene urea can act as a solvent for dissolving a coloring material similarly to other general water-soluble organic solvents, and therefore, ethylene urea is contained in the water-soluble organic solvent in the present invention. It is necessary for the content A (% by mass) of the coloring material (i.e., the compound represented by the general formula (I)) and the content B (% by mass) of the ethylene urea, based on the total mass of the ink, to satisfy the relationship of $0.20 \leq B/A \leq 10.0$. It is favorable to satisfy the relationship of $0.1 \leq B/A \leq 5.0$. Furthermore, the content (% by mass) of the ethylene urea in the ink is, based on the total mass of the ink, favorably 0.1% by mass or more and 15.0% by mass or less, more favorably 5.0% by mass or more and 15.0% by mass or less, and particularly favorably 7.0% by mass or more and 12.0% by mass or less.

Alkanediol

The vaster-soluble organic solvent to be contained in the ink according to the present invention includes alkanediol having 4 to 6 carbon atoms. If the number of carbon atoms of the alkanediol is 3 or less, the effect of being a poor medium for the compound represented by the general formula (I) (coloring material) is weak. Therefore, the coloring material is hard to be segregated and hence the light resistance and the ozone resistance are insufficient. Besides, the regression phenomenon is not easily caused, and hence the intermittent ejection stability is insufficient. On the other hand, if the number of carbon atoms of the alkanediol is 7 or more, although the alkanediol functions as a poor medium, the viscosity of the ink is excessively high, and hence the intermittent ejection stability is insufficient.

It is necessary for the content A (% by mass) of the compound represented by the general formula (I) (coloring material) and the content C (% by mass) of the alkanediol having 4 to 6 carbon atoms, based on the total mass of the ink, to satisfy the relationship of $0.10 \leq C/A \leq 10.0$. It is favorable, to satisfy the relationship of $0.50 \leq C/A \leq 5.0$. The content (% by mass) of the alkanediol having 4 to 6 carbon atoms in the ink is, based on the total mass of the ink, favorably 0.1% by mass or more and 10.0% by mass or less, more favorably 1.0% by mass or more and 8.0% by mass or less, and particularly favorably 3.0% by mass or more and 6.0% by mass or less.

Examples of suitably usable alkanediol include 2-methyl-1,3-propanediol, 2-ethyl-1,3-propanediol, 2,2-dimethyl-1,3-propanediol, 2,2-diethyl-1,3-propanediol, 2-methyl-2-propyl-1,3-propanediol, 1,2-butanediol, 1,3-butanediol, 1,4-butanediol, 2,3-butanediol, 3-methyl-1,3-butanediol, 1,2-pentanediol, 1,4-pentanediol, 1,5-pentanediol, 2-methyl-1,5-pentanediol, 3-methyl-1,5-pentanediol, 1,2-hexanediol; 1,5-hexanediol and 1,6-hexanediol.

An example of more suitable alkanediol includes a compound having hydroxy groups at both ends of the main chain. If the alkanediol is not a compound having hydroxy groups at both ends of the main chain (for example, 1,2-hexanediol), the effect to improve the intermittent ejection stability may not be sufficiently attained in some cases. It is noted that the main chain of the alkanediol herein refers to a longest hydrocarbon chain in the molecular structure.

The alkanediol is favorably 1,5-pentanediol, 3-methyl-1, 5-pentanediol or 1,6-hexanediol. When such a compound is used, an ink that is capable of recording an image with more excellent light resistance and ozone resistance and has more excellent intermittent ejection stability can be obtained.

Especially, 1,5-pentanediol is particularly favorably used as the alkanediol. When 1,5-pentanediol is used, an ink capable of recording an image with ozone resistance of higher level can be obtained. The present inventors presume the reason for such high-level ozone resistance as follows. Since the alkanediol is a poor medium for the compound represented be the general formula (I) as described above, the aggregation of the compound is accelerated so as to improve the ozone resistance of an image to be recorded. The of effect of a poor medium to accelerate the aggregation is larger as the hydrophobicity of the water-soluble organic solvent is higher. Accordingly, as the number of carbon atoms of the alkanediol is larger, the effect of a poor medium to accelerate the aggregation is liable to be increased. On the other hand, the aqueous solution containing the compound represented by the general formula (I) has such a characteristic that the viscosity thereof is abruptly increased due to the decrease in pH thereof. This is probably because the compound represented by the general formula (I) is easily aggregated by a proton. In general, alcohol is liable to release mere protons as the carbon number thereof is smaller, nod therefore, from the viewpoint of the aggregation caused by a proton, an alkanediol having a smaller number of carbon atoms tends to easily aggregate the compound represented by the general formula (I). From these points of view, 1,5-pentanediol has good balance between the hydrophobicity and the proton releasing property, and hence has the largest effect to accelerate the aggregation of the compound represented by the general formula (I) among various alkanediols. This is probably the reason why the ozone resistance of an image to be recorded can be particularly effectively improved when 1,5-pentanediol is used.

Compound Represented by General Formula (III)

The water-soluble organic solvent favorably further includes a compound represented by the following general formula (III). The content (% by mass) of the compound represented by the general formula (III) in the ink is, based on the total mass of the ink, favorably 0.1% by mass or more and 15.0% by mass or less, more favorably 3.0% by mass or more and 15.0% by mass or less, and particularly favorably 4.0% by mass or more and 12.0% by mass or less.

wherein, $R_{10}$ each independently represents a hydroxyalkyl group, and $R_{11}$ represents —S(=O)— or —S(=O)$_2$—.

In the compound represented by the general formula (III), from the viewpoint of solubility in an aqueous medium, hydroxyalkyl groups represented by $R_{10}$ favorably each independently have 1 to 12 carbon atoms. Suitable examples of the compound represented by the general formula (III) include the following compounds. Needless to say, the compound of the present invention is not limited to these compounds so far as the compound is encompassed in the structure and the definition of the general formula (III).

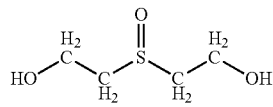

Bis(2-hydroxyethyl)sulfoxide

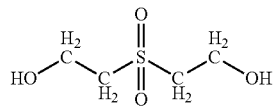

Bis(2-hydroxyethyl)sulfone

In the present invention, the two substituents $R_{10}$ in the general to formula (III) are favorably the same as each other and are more favorably both a hydroxyethyl group. Especially, the compound represented by the general formula (III) is particularly favorably bis(2-hydroxyethyl)sulfone.

When the compound represented by the general formula (III) is contained in the ink, the intermittent ejection stability can be further improved. The present inventors presume the reason for this improvement as follows: In the present invention, the alkanediol is used as a poor medium for the compound represented by the general formula (I). When water is evaporated through an ejection orifice of a recording head, the concentration of the alkanediol becomes relatively high in the vicinity of the ejection orifice, and hence the solubility of the compound represented by the general formula (I) is lowered. Then, the compound represented by the general formula (I) moves from the vicinity of the ejection orifice of the recording head toward the inside of a nozzle (common liquid chamber) where the amount of water is large and a more stably dissolved state is easily attained (receding phenomenon). In this manner, the amount of the coloring material present in the vicinity of the ejection orifice is reduced, the viscosity increase of the ink is suppressed, and the intermittent ejection stability is improved. It seems that the receding phenomenon becomes likely to more remarkably be caused by allowing the compound represented by the general formula (III) to be contained in the ink. The compound represented by the general formula (III) has high polarity because of —S(=O)— or —S(=O)$_2$— present in the molecular structure, and hence has high affinity with the compound represented by the general formula (I). Accordingly, when water is evaporated through the ejection orifice of the recording head, the regression phenomenon is further accelerated by preventing excessive association of the compound represented by the general formula (I), which seems to result in the improvement of the intermittent ejection stability of the ink. Incidentally, if has been revealed, through investigation made by the present inventors, that the compound represented by the general formula (III) has high affinity with the compound represented by the general formula (I) but does not degrade the light resistance and the ozone resistance of an image to be recorded. This is probably because that aggregation behavior of the compound represented by the general formula (I) which is accompanied with the evaporation of the ink and occurs on a recording medium is dominantly affected by the ethylene urea and the alkanediol.

Surfactant Represented by General Formula (IV)

The ink according to the present invention can further contain a surfactant represented by the following general formula (IV).

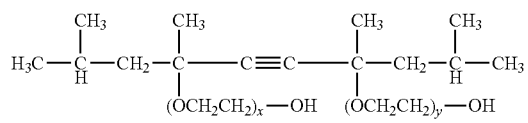

wherein 4.0≤x+y≤8.0.

When the compound represented by the general formula (I) is used, the performance of an acetylene glycol surfactant is difficult to be sufficiently exhibited due to the structure as compared with that exhibited when using an azo coloring material having another structure. Therefore, in order to attain desired surface tension or the ink by using a general acetylene glycol surfactant in which an average addition mole number of ethylene oxide groups is 10.0, it is necessary to increase the amount of surfactant to be used, which excessively increases the viscosity of the ink. For overcoming this problem, the present inventors have made investigations, resulting in finding that it is effective to use an acetylene glycol surfactant having an average addition mole number (x+y) of ethylene oxide groups failing in a range of 4.0≤x+y≤8.0. When the acetylene glycol surfactant having an average addition mole number (x+y) of ethylene oxide groups falling in the range of 4.0≤x+y≤8.0 is used, the intermittent ejection stability can be improved while suppressing the viscosity increase of the ink by reducing the amount of surfactant to be used.

Furthermore, the present inventors have found than the effect to improve the intermittent ejection stability can be attained far beyond expectations when the ink according to the present invention containing the compound represented by the general formula (I), the ethylene urea and the alkanediol further contains the surfactant represented by the general formula (IV). The present inventors presume the reason as follows:

When water of the ink is evaporated through an ejection orifice of a recording head, the surfactant is oriented at a gas-liquid interface, the viscosity of the ink present in the vicinity of the ejection orifice is increased, and hence the intermittent ejection stability is liable to degrade. The orientation rate of the surfactant more rapidly occurs as the value x+y is smaller, namely, the molecular size is smaller, or the hydrophobicity is higher. Accordingly, a surfactant having a small value of x+y is disadvantageous from the viewpoint of improving the intermit font ejection stability of the ink. Here, since the ethylene urea having a moisturizing function is present in the ink, the evaporation of the water of the ink through the ejection orifice of the recording head is suppressed, and the orientation of the surfactant represented by the general formula (IV) at the interface is remarkably suppressed. At this point, since the evaporation of the water is suppressed, a function to orientation of the surfactant is more remarkably exhibited as a surfactant having a smaller value of x+y, which can be naturally rapidly oriented, is used. Furthermore, owing to the high affinity between the alkanediol contained, in the ink and the surfactant having a smaller value of x+y and high hydrophobicity, the speed of the orientation of the surfactant is effectively lowered. In this manner the intense franc ejection stability is presumed to be remarkably improved due to a synergistic effect exhibited by the respective components.

As described above, when the surfactant represented by the formula (VI) having an average addition mole number of ethylene oxide groups falling in the range of $4.0 \leq x+y \leq 8.0$ is added to the ink, surface tension appropriate as an ink jet ink and reliability can be both attained. When fine value x+y is more than 8.0, the content of the surfactant represented by the general formula (IV) is increased for attaining appropriate surface tension, and hence the intermittent ejection stability of the ink may be lowered in some cases. On the other hand, when the value x+y is less than 4.0, the hydrophobicity of the surfactant is so strong that the surfactant is easily oriented at the interface of the ink, and hence the intermittent ejection stability may be rather lowered in some cases. Besides, when the value x+y is less than 4.0, the solubility of the surfactant in water is so low that phase separation may be caused in the surfactant. Incidentally, a case where x+y=0 means that there is no ethylene oxide group.

Suitable examples of the surfactant represented by the general formula (IV) include, in tradenames, Acetylene E70 (wherein x+y=7.0), Acetylenol E60 (wherein x+y=6.0) and Acetylenol E40 (wherein x+y=4.0) (all manufactured by Kawaken Fine Chemicals Co., Ltd.); and Surfynol 440 (wherein x+y=3.4) (manufactured by Nissin Chemical Industry Co., Ltd.).

The average addition mole number of ethylene oxide groups of the surfactant represented by the general formula (IV) means an average oil the numbers of moles of repeating units of ethylene oxide group ($—CH_2—CH_2—O—$) added per mole of the surfactant represented by the general formula (IV). An addition mole number of ethylene oxide groups can be obtained by a general analysis method such as liquid chromatography-mass spectrometry (LC/MS) or gas chromatography-mass spectrometry (GC/MS).

In the present invention, the proportion (mol %) of addition mole numbers of ethylene oxide groups falling in the range of $4.0 \leq x+y \leq 8.0$ to addition mole numbers of all ethylene oxide groups in the surfactant represented by the general formula (IV) can be 25.0% or more. When the proportion is less than 25.0%, a surfactant having x+y less than 4.0 or more then 8.0 is contained in a large amount. Accordingly, the content of the surfactant having low solubility in water is large, and therefore, the surfactant is easily separated or the amount of surfactant to be added for attaining desired surface tension becomes large. Therefore, excellent level of intermittent ejection stability may not be sufficiently attained in some cases.

The proportion of the addition mole numbers of ethylene oxide groups falling in the range of $4.0 \leq x+y \leq 8.0$ to the addition mole numbers of all ethylene oxide groups is calculated based en peak areas obtained by high performance liquid chromatography. Specifically, the proportion is calculated according to the expression: (peak area of surfactant with $4.0 \leq x+y \leq 8.0$)/(peak area of surfactant with any x+y values)*100(%).

The conditions for analysis by the high performance liquid chromatography are as follows:

Column: LiChrosorb DIOL 5 μm (manufactured by Merck & Co. Inc.) 4.6 mm×250 mm
Column temperature: 40° C.
Flow rate: 1.0 mL/min.
Detector: RI-8020
Concentration: 0.3 g/20 mL
Injection amount: 20 μL
Pressure: 3.4 MPa
Eluent: n-hexane/isopropyl alcohol=80/20

The values of the proportion of respective surfactants (all in tradenames) used in examples described later and obtained by the aforementioned method under the aforementioned conditions are as follows:

Acetylenol E100 (x+y=10.0): 50.5%
Acetylenol E70 (x+y=7.0): 57.1%
Acetylenol E60 (x+y=6.0): 50.0%
Acetylenol E40 (x+y=4.0): 23.3%
Acetylenol E00 (x+y=0.0): 0.0%

If a plurality of compounds respectively having different average addition more numbers (x+y) of ethylene oxide groups are used as the surfactant represented by the general formula (IV), the average addition mole number (x+y) of ethylene oxide groups is determined according to the contents of the compounds. Here, a prescribed range of the average addition mole number can be satisfied, for form's sake, by combining compounds whose average addition mole numbers of ethylene oxide groups are known. When a surfactant having a small addition mole number is contained in the ink in a rather large amount, however, the effect of the present invention for solving the problem of the intermittent ejection stability cannot be sufficiently attained in some cases, and hence such application is not so favorable.

A content D (% by mass) of the surfactant represented by the general, formula (IV) in the ink can be a content necessary for attaining a desired value of the surface tension of the ink. Besides, a favorable range of the content may be determined according to the average addition mole number (x+y) of ethylene oxide groups of the surfactant represented by the general formula (IV). Specifically, the content D (% by mass) of the surfactant represented by the general formula (IV) in the ink is, based on the total mass of the ink, favorably 0.1% by mass or more and 2.0% by mass or less, and the value x+y is favorably selected so as to make the content fall in this range. The content is particularly favorably 0.5% by mass or more and 1.0% by mass or less, and the value x+y is more favorably selected so as to make the content fall in this range.

In the present invention, the content D (% by mass) of the surfactant represented by the general formula (IV), the content B (% by mass) of the ethylene urea and the content C (% by mass) of the alkanediol based on the total mass of the ink can satisfy the following relationships. Specifically, the ink according to the present invention favorably satisfies a relationship of $D/(B+C) \leq 0.40$. The value D/(B+C) is more favorably 0.20 or less and particularly favorably 0.10 or less. When the value of D/(B+C) is more than 0.10, the content of the surfactant represented by she general formula (IV) is so large that the effect to improve the intermittent ejection stability cannot be sufficiently attained in some cases. Besides, in order to sufficiently attain an effect of the use of the surfactant represented by the general formula (IV), a relationship of 0.003≤D/(B+C) can be satisfied. Particularly, the value of D/(B+C) can be 0.01 or more.

Incidentally, Patent Document 3 describes that the intermittent election stability of an ink is improved by simultaneously using a specific azo coloring material, an alkanediol and an acetylene glycol, surfactant having a total audition mole number of ethylene oxide groups of 0 or more and 8.0 or less. When the present inventors prepared, an ink satisfying the conditions described in Patent Document 3 and evaluated the intermittent ejection stability of the prepared ink, however, it was found that the intermittent ejection stability at a level demanded by the present inventors could not be attained. It is probably because the alkanediol used in Patent Document 3 acted as a good solvent for the specific coloring material.

Aqueous Medium

An aqueous solvent that is water or a mixed solvent of water and a wafer-soluble organic solvent may be used in the ink according to the present invention. In the present invention, the ink can be an aqueous ink containing at least wafer as the aqueous solvent. Deionized water (ion-exchanged water) is favorably used as the water. The content (% by mass) of water in the ink is favorably 10.0% by mass or more and 90.0% by mass or less based on the total mass of the ink.

No particular limitation is imposed on the water-soluble organic solvent so far as the solvent is soluble in water, alcohols, polyglycols, glycol ethers, nitrogen-containing polar solvents and sulfur-containing polar solvents may be used. The content (% by mass) of the water-soluble organic solvent in the ink is favorably 5.0% by mass or more and 90.0% by mass or less, more favorably 10.0% by mass or more and 50.0% by mass or less, based on the total mass of the ink. Incidentally, the range of the content of the water-soluble organic solvent is a value including the ethylene urea, the alkanediol having 4 to 6 carbon atoms and the compound represented by the general formula (III) usable as needed. If the content of the water-soluble organic solvent is below or beyond the above-described range, the ejection stability of the resulting ink may not be sufficiently achieved at a high level in some cases.

Other Additives

The ink according to the present invention may contain a water-soluble organic compound which is solid at ordinary temperature, seen as a polyhydric alcohol such as trimethylolpropane or trimethylolethane, urea or a derivative thereof, in addition to the above-described components as needed. In addition, the ink according to the present invention may also contain various additives such as a surfactant, a pH adjuster, a rust preventive, a preservative, a mildew proofing agent, an antioxidant, an anti-reducing agent, an evaporation accelerator, a chelating agent and a water-soluble polymer as needed.

Other Inks

In order to record a full-color image, the ink according to the present invention may be used in combination with other inks having a hue different from the ink according to the present invention. As examples of the other inks, may be mentioned at least one ink selected from the group consisting of black, cyan, magenta, yellow, red, green and blue inks. What is called a light color ink having substantially the same hue as such an ink may also be further used in combination. Coloring materials used in the other inks and light color ink may be publicly known dyes or newly synthesized dyes.

Physical Properties of Ink

The surface tension at 25° C. of the ink according to the present invention is favorably 10 mN/m or more and 60 mN/m or less, more favorably 20 mN/m or mere and 60 mN/m or less, and particularly favorably 30 mN/m or more end 40 mN/m or less. When the surface tension of the ink falls in the aforementioned range, occurrence of, for example, dot misalignment (deviation of ink impact position) caused by wetting in the vicinity of an ejection orifice when the ink is applied to an ink jet system can be effectively suppressed. The surface tension of the ink can be adjusted by appropriately setting the contents of the surfactant, the water-soluble organic solvent and the like in the ink. Furthermore, the viscosity of the ink can be adjusted so that good ejection characteristics can be attained in ejecting the ink through an ejection orifice of a recording head of the ink jet system. The viscosity at 25° C. of the ink according to the present invention is favorably 1.0 mPa·s or more and 5.0 mPa·s or less, and more favorably 1.0 mPa·s or more and 3.0 mPa·s or less.

Ink Cartridge

The ink cartridge according to the present invention is provided with an ink and an ink storage portion storing this ink. The ink stored in the ink storage portion is the above-described ink according to the present invention. FIG. 1 is a sectional view schematically illustrating an ink cartridge according to an embodiment of the present invention. As illustrated in FIG. 1, an ink supply port 12 for supplying an ink to a recording head is provided in a bottom of the ink cartridge. The interior of the ink cartridge is the ink storage portion storing the ink. The ink storage portion is made up by an ink storage chamber 14 and an absorber storage chamber 16, and these chambers are communicated with each other through a communication port 18. The absorber storage chamber 16 is communicated with the ink supply port 12. A liquid ink 20 is stored in the ink storage chamber 14, and absorbers 22 and 24 holding the ink in an impregnated state are stored in the absorber storage chamber 16. The ink storage portion may also be so constructed that the whole amount of the ink stored is held by the absorber without providing the ink storage chamber. In addition, the ink storage portion may also be so constructed that the whole amount of the ink is stored in a liquid state without having the absorber. Further, the ink cartridge may also be constructed so as to have an ink storage portion and a recording head.

Ink Jet Recording Method

The ink jet recording method according to the present invention is a method of ejecting the above-described ink according to the present invention by a recording head of an ink jet system to record an image on a recording medium. Systems for ejecting the ink include a system in which mechanical energy is applied to the ink and a system in which thermal energy is applied to the ink. In the present invention, the system in which the thermal energy is applied to the ink to eject the ink is particularly favorably adopted. Steps of the ink jet recording method may be those publicly known except that the ink according to the present invention is used.

Figure 2A:
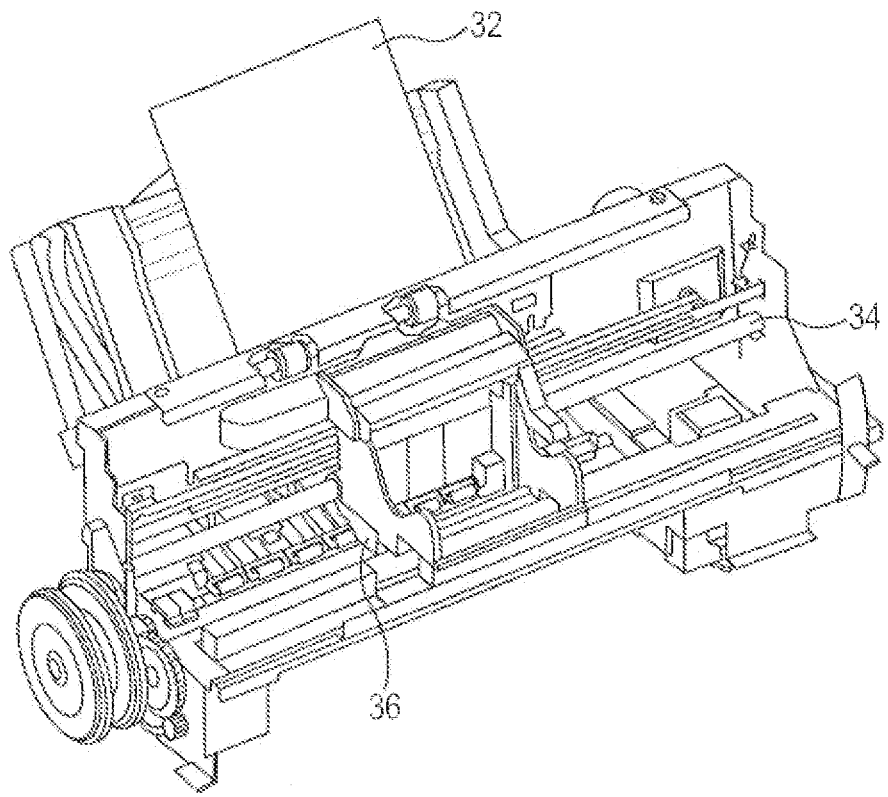
Figure 2B:
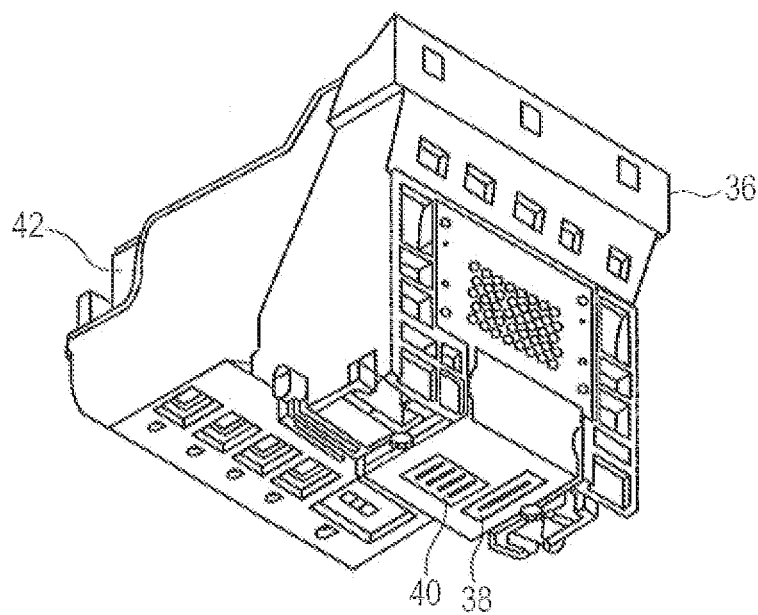

FIGS. 2A and 2B schematically illustrate an exemplary ink jet recording apparatus used in the ink jet recording method according to the present invention in which FIG. 2A is a perspective view illustrating a principal part of the ink jet recording apparatus, and FIG. 2B is a perspective view illustrating a head cartridge. In the ink jet recording apparatus, a conveyance unit (not illustrated) for conveying a recording medium 32 and a carriage shaft 34 are provided. A head cartridge 36 can be installed on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

Examples

The present invention will hereinafter be described in more detail by the following Examples and Comparative Examples. However, the present invention is not limited by the following examples unless going beyond the gist of the present invention. Incidentally, all designations of "part" or "parts" and "%" as to amounts of components described below are based on mass unless expressly noted.

Preparation of Coloring Material
Compound A
(a)

To a solution of 13.3 g of a compound represented by the following formula (1) dissolved in 100 mL of methanol, 20 mL of an aqueous solution of 4.5 g of potassium hydroxide dissolved in water and 10.0 g of 1,2-dibromoethane were added. After refluxing for 2 hours, precipitated crystal was filtered out to obtain 13.0 g of a compound represented by the following formula (2):

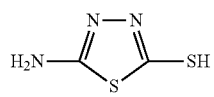
(1)

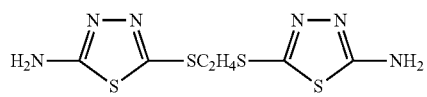
(2)

(b)

A mixed solution of 59.8 g of a compound represented by the following formula (3), 32.0 g of pivaloylacetonitrile, 65.0 g of sodium bicarbonate, 340 mL of water and 340 mL of ethanol was heated for 2 hours, and 60 mL of hydrochloric acid was added thereto. After heating for another 2 hours, precipitated crystal was filtered to obtain 61.0 g of a compound represented by the following formula (4):

(3)

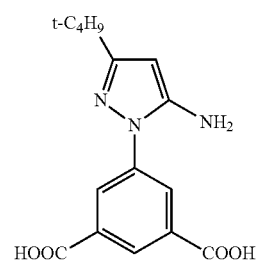
(4)

(c)

A mixed solution of 6.0 of the compound represented by the formula (4) obtained in the process (b), 80 mL of methanol and 30 g of sodium acetate was cooled to 10° C. or less. Furthermore, 3.0 g of the compound represented by the formula (2) obtained in the process (a) and sodium nitrite were mixed to obtain a diazo solution. The diazo solution was added to the mixed solution at a temperature of 10° C. or lower, followed by stirring for 2 hours at room temperature. The thus precipitated crystal was filtered out, and purified by column chromatography using Sephadex (tradename). To the resultant, hydrochloric acid was added so as to adjust pH to 1.0 or less, whereby obtaining 4.3 g of a compound A represented by the following formula (5) in a free acid form.

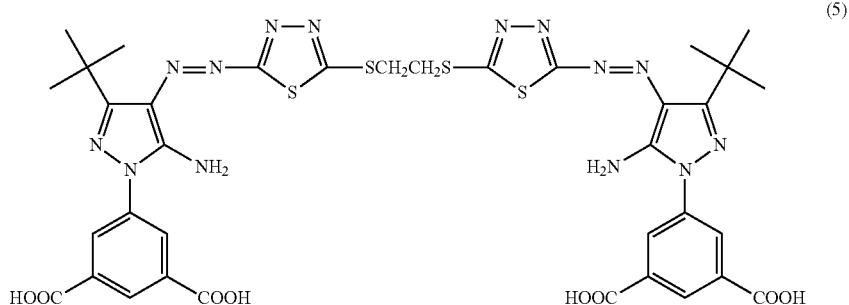
(5)

(d)

To the free acid form compound to obtained in the process (c), a potassium hydroxide aqueous solution was added for adjusting pH to 8.0 to obtain a potassium salt form compound A.

Comparative Compound A

A sodium salt of a compound represented by the following formula (6) in a free acid form was synthesized with reference to description of International Publication

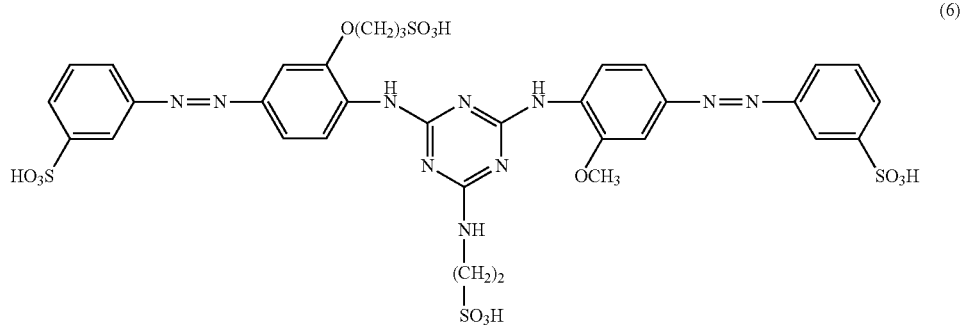

(6)

Preparation of Inks

After the respective components (unit: %) shown in upper parts of Tables 3-1 to 3-4 were mixed and sufficiently stirred, the resultant respective mixtures were filtered under pressure through a fitter having a pore size of 0.20 μm, thereby preparing respective inks. Incidentally, "Acetylenol E100", "Acetylene E70", "Acetylenol E60", "Acetylenol E40" and "Acetylenol E00" shown in Tables 3-1 to 3-4 are all surfactants having the structures represented by the general formula (IV). They are all tradenames of nonionic surfactants manufactured by Kawaken Fine Chemicals Co., Ltd., and are each accompanied by a value of "x+y" in the parentheses in these tables. Furthermore, in lower parts of Tables 3-1 to 3-4, "value of B/A", "value of C/A", "value of D/(B+C)", "average of x+y" and "proportion of specific surfactant" of each ink are shown. Incidentally, "proportion of specific surfactant" means the proportion (mol %), in the surfactants represented by the general formula (IV), or the addition mole number of ethylene oxide groups falling in the range of $4.0 \leq x+y \leq 8.0$ to one addition mole number of all ethylene oxide groups.

TABLE 3-1

Compositions and Characteristics of Inks

| | Example | | | | | | | |
|---|---|---|---|---|---|---|---|---|
| | 1 | 2 | 3 | 4 | 5 | 6 | 7 | 8 |
| Compound A | 3.50 | 3.50 | 3.50 | 3.50 | 3.50 | 2.50 | 3.50 | 2.00 |
| C.I. Direct Yellow 86 | | | | | | | | |
| Comparative Compound A | | | | | | | | |
| Ethylene Urea | 7.50 | 7.50 | 7.50 | 7.50 | 0.70 | 25.00 | 7.50 | 0.70 |
| Urea | | | | | | | | |
| 2-Pyrrolidone | | | | | | | | |
| 1,3-Dimethyl-2-imidazolidinone | | | | | | | | |
| 1,3-Propanediol | | | | | | | | |
| 1,4-Butanediol | | 5.00 | | | | | | |
| 1,5-Pentanediol | 5.00 | | | | 5.00 | 0.35 | 0.35 | 20.00 |
| 3-Methyl-1,5-pentanediol | | | 5.00 | | | | | |
| 1,6-Hexanediol | | | | 5.00 | | | | |
| 1,7-Heptanediol | | | | | | | | |
| Bis(2-hydroxyethyl)sulfone | 7.50 | 7.50 | 7.50 | 7.50 | 7.50 | 2.50 | 7.50 | 2.50 |
| Glycerin | 10.00 | 10.00 | 10.00 | 10.00 | 16.80 | 2.15 | 14.65 | 6.80 |
| Diethylene Glycol Monobutyl Ether | | | | | | | | |
| Triethylene Glycol Monobutyl Ether | | | | | | | | |
| Triethylene Glycol | | | | | | | | |
| Acetylenol E100 (x + y = 10.0) | | | | | | | | |
| Acetylenol E70 (x + y = 7.0) | | | | | | | | |
| Acetylenol E60 (x + y = 6.0) | 0.80 | 0.80 | 0.80 | 0.80 | 0.80 | 0.80 | 0.80 | 0.80 |
| Acetylenol E40 (x + y = 4.0) | | | | | | | | |
| Acetylenol E00 (x + y = 0.0) | | | | | | | | |
| Ion-exchanged Water | 65.70 | 65.70 | 65.70 | 65.70 | 65.70 | 66.70 | 65.70 | 67.20 |
| Value of B/A | 2.1 | 2.1 | 2.1 | 2.1 | 0.2 | 10.0 | 2.1 | 0.4 |
| Value of C/A | 1.4 | 1.4 | 1.4 | 1.4 | 1.4 | 0.1 | 0.1 | 10.0 |
| Value of D/(B + C) | 0.064 | 0.064 | 0.064 | 0.064 | 0.14 | 0.032 | 0.10 | 0.039 |
| Average of x + y | 6.0 | 6.0 | 6.0 | 6.0 | 6.0 | 6.0 | 6.0 | 6.0 |
| Proportion of Specific Surfactant (mol %) | 50.0 | 50.0 | 50.0 | 50.0 | 50.0 | 50.0 | 50.0 | 50.0 |

TABLE 3-2

Compositions and Characteristics of Inks

| | Example | | | | | | | |
|---|---|---|---|---|---|---|---|---|
| | 9 | 10 | 11 | 12 | 13 | 14 | 15 | 16 |
| Compound A | 3.50 | 3.50 | 3.50 | 3.50 | 3.50 | 3.50 | 3.50 | 3.50 |
| C.I. Direct Yellow 86 | | | | | | | | |
| Comparative Compound A | | | | | | | | |
| Ethylene Urea | 7.50 | 7.50 | 7.50 | 7.50 | 1.36 | 1.36 | 7.50 | 1.36 |
| Urea | | | | | | | | |
| 2-Pyrrolidone | | | | | | | | |
| 1,3-Dimethyl-2-imidazolidinone | | | | | | | | |
| 1,3-Propanediol | | | | | | | | |
| 1,4-Butanediol | | | | | | | | |
| 1,5-Pentanediol | 5.00 | 5.00 | 5.00 | 5.00 | 1.50 | 1.50 | 5.00 | |
| 3-Methyl-1,5-pentanediol | | | | | | | | |
| 1,6-Hexanediol | | | | | | | | | 1.50 |
| 1,7-Heptanediol | | | | | | | | |
| Bis(2-hydroxyethyl)sulfone | 7.50 | 7.50 | 7.50 | 7.50 | 7.50 | 7.50 | | |
| Glycerin | 10.00 | 10.00 | 10.00 | 10.00 | 19.64 | 19.64 | 17.50 | 27.14 |
| Diethylene Glycol Monobutyl Ether | | | | | | | | |
| Triethylene Glycol Monobutyl Ether | | | | | | | | |
| Triethylene Glycol | | | | | | | | |
| Acetylenol E100 (x + y = 10.0) | | | 1.00 | 1.33 | | | | |
| Acetylenol E70 (x + y = 7.0) | | | 0.50 | 0.66 | | | | |
| Acetylenol E60 (x + y = 6.0) | | | | | 1.15 | 1.20 | 0.80 | 1.20 |
| Acetylenol E40 (x + y = 4.0) | 0.23 | 0.60 | | | | | | |
| Acetylenol E00 (x + y = 0.0) | 0.08 | | | | | | | |
| Ion-exchanged Water | 66.19 | 65.90 | 65.00 | 64.51 | 65.35 | 65.30 | 65.70 | 65.30 |
| Value of B/A | 2.1 | 2.1 | 2.1 | 2.1 | 0.4 | 0.4 | 2.1 | 0.4 |
| Value of C/A | 1.4 | 1.4 | 1.4 | 1.4 | 0.4 | 0.4 | 1.4 | 0.4 |
| Value of D/(B + C) | 0.018 | 0.048 | 0.040 | 0.053 | 0.40 | 0.42 | 0.064 | 0.42 |
| Average of x + y | 3.0 | 4.0 | 8.0 | 9.0 | 6.0 | 6.0 | 6.0 | 6.0 |
| Proportion of Specific Surfactant (mol %) | 21.7 | 29.3 | 52.7 | 52.7 | 50.0 | 50.0 | 50.0 | 50.0 |

TABLE 3-3

Compositions and Characteristics of Inks

| | Comparative Example | | | | | | |
|---|---|---|---|---|---|---|---|
| | 1 | 2 | 3 | 4 | 5 | 6 | 7 |
| Compound A | 3.50 | 3.50 | 3.50 | 3.50 | 3.50 | 3.50 | 3.50 |
| C.I. Direct Yellow 86 | | | | | | | |
| Comparative Compound A | | | | | | | |
| Ethylene Urea | | | | | 7.50 | 7.50 | 7.50 |
| Urea | | 7.50 | | | | | |
| 2-Pyrrolidone | | | 7.50 | | | | |
| 1,3-Dimethyl-2-imidazolidinone | | | | 7.50 | | | |
| 1,3-Propanediol | | | | | | 5.00 | |
| 1,4-Butanediol | | | | | | | |
| 1,5-Pentanediol | 5.00 | 5.00 | 5.00 | 5.00 | | | |
| 3-Methyl-1,5-pentanediol | | | | | | | |
| 1,6-Hexanediol | | | | | | | |
| 1,7-Heptanediol | | | | | | | 5.00 |
| Bis(2-hydroxyethyl)sulfone | 7.50 | 7.50 | 7.50 | 7.50 | 7.50 | 7.50 | 7.50 |
| Glycerin | 17.50 | 10.00 | 10.00 | 10.00 | 15.00 | 10.00 | 10.00 |
| Diethylene Glycol Monobutyl Ether | | | | | | | |
| Triethylene Glycol Monobutyl Ether | | | | | | | |
| Triethylene Glycol | | | | | | | |
| Acetylenol E100 (x + y = 10.0) | | | | | | | |
| Acetylenol E70 (x + y = 7.0) | | | | | | | |
| Acetylenol E60 (x + y = 6.0) | 0.80 | 0.80 | 0.80 | 0.80 | 0.80 | 0.80 | 0.80 |
| Acetylenol E40 (x + y = 4.0) | | | | | | | |
| Acetylenol E00 (x + y = 0.0) | | | | | | | |
| Ion-exchanged Water | 65.70 | 65.70 | 65.70 | 65.70 | 65.70 | 65.70 | 65.70 |
| Value of B/A | 0.0 | 0.0 | 0.0 | 0.0 | 2.1 | 2.1 | 2.1 |
| Value of C/A | 1.4 | 1.4 | 1.4 | 1.4 | 0.0 | 0.0 | 0.0 |
| Value of D/(B + C) | 0.16 | 0.16 | 0.16 | 0.16 | 0.11 | 0.11 | 0.11 |
| Average of x + y | 6.0 | 6.0 | 6.0 | 6.0 | 6.0 | 6.0 | 6.0 |
| Proportion of Specific Surfactant (mol %) | 50.0 | 50.0 | 50.0 | 50.0 | 50.0 | 50.0 | 50.0 |

TABLE 3-4

Compositions and Characteristics of Inks

| | Comparative Example | | | | | | |
|---|---|---|---|---|---|---|---|
| | 8 | 9 | 10 | 11 | 12 | 13 | 14 |
| Compound A | 3.50 | 2.50 | 3.50 | 2.00 | 3.50 | 2.40 | |
| C.I. Direct Yellow 86 | | | | | | | 3.50 |
| Comparative Compound A | | | | | | 1.20 | |
| Ethylene Urea | 0.60 | 26.00 | 7.50 | 0.70 | | | 7.50 |
| Urea | | | | | | 0.60 | |
| 2-Pyrrolidone | | | | | 7.50 | 1.20 | |
| 1,3-Dimethyl-2-imidazolidinone | | | | | | | |
| 1,3-Propanediol | | | | | | | |
| 1,4-Butanediol | | | | | | | |
| 1,5-Pentanediol | 7.00 | 0.35 | 0.30 | 21.00 | | | 5.00 |
| 3-Methyl-1,5-pentanediol | | | | | | | |
| 1,6-Hexanediol | | | | | | | |
| 1,7-Heptanediol | | | | | | | |
| Bis(2-hydroxyethyl)sulfone | 7.50 | 2.50 | 7.50 | 2.50 | | | 7.50 |
| Glycerin | 14.90 | 1.15 | 14.70 | 5.80 | 17.50 | 17.40 | 10.00 |
| Diethylene Glycol Monobutyl Ether | | | | | 5.00 | | |
| Triethylene Glycol Monobutyl Ether | | | | | | 5.40 | |
| Triethylene Glycol | | | | | | 5.40 | |
| Acetylenol E100 (x + y = 10.0) | | | | | | 0.60 | |
| Acetylenol E70 (x + y = 7.0) | | | | | | | |
| Acetylenol E60 (x + y = 6.0) | 0.80 | 0.80 | 0.80 | 0.80 | 0.80 | | 0.10 |
| Acetylenol E40 (x + y = 4.0) | | | | | | | |
| Acetylenol E00 (x + y = 0.0) | | | | | | | |
| Ion-exchanged Water | 65.70 | 66.70 | 65.70 | 67.20 | 65.70 | 65.80 | 66.40 |
| Value of B/A | 0.17 | 10.4 | 2.1 | 0.4 | 0.0 | 0.0 | — |
| Value of C/A | 2.0 | 0.1 | 0.09 | 10.5 | 0.0 | 0.0 | — |
| Value of D/(B + C) | 0.11 | 0.030 | 0.10 | 0.037 | — | — | 0.008 |
| Average of x + y | 6.0 | 6.0 | 6.0 | 6.0 | 6.0 | 6.0 | 6.0 |
| Proportion of Specific Surfactant (mol %) | 50.0 | 50.0 | 50.0 | 50.0 | 50.0 | 50.5 | 50.0 |

Evaluation

Each of the inks obtained above was charged into an ink cartridge, and the ink cartridge was installed in an ink jet recording apparatus (trade name "PIXUS iP8600", manufactured by Canon Inc.) in which an ink is ejected from a recording head by the action of thermal energy. In this embodiment, a solid image recorded by applying 22 ng of an ink to a unit region of 1/600 inch×1/600 inch is defined as "recording busy of 100%". For evaluation of the light resistance and the ozone resistance, a spectrophotometer (tradename "Spectrolino", manufactured by Gretag Macbeth Ag) was used for measuring an optical density under conditions of a light source of D50 and a visual field of 2°. In the present invention, with respect to evaluation criteria for each item below, B and C (and D) are defined as unacceptable levels, and (AA and) A are defined, as acceptable levels. The results of the evaluation are shown in Table 4.

Light Resistance

The above-described ink jet recording apparatus was used for producing a recorded product by recording a solid image with a recording duty of 100% on a recording medium (tradename "Canon Photographic Paper, Gloss Pro <Platinum Grade> PT101", manufactured by Canon Inc.) under an environment of a temperature of 23° C. and relative humidity of 55%. The obtained recorded product way dried for 24 hours under an environment of a temperature of 23° C. and relative humidity of 55%. The optical density of the solid image in the obtained recorded product was measured (as an optical density before a light resistance test). The recorded product was placed in a super xenon test apparatus (tradename "SX-75", manufactured by Suga Test Instruments Co., Ltd.), so as to be irradiated with xenon light at a temperature within a vessel of 24° C., relative humidity of 60% and irradiation intensity of 100 klux for 168 hours. Thereafter, the optical density of the solid image in the recorded product was measured (as an optical density after the light resistance test). Based on the values of the optical density before the light resistance test and the optical density after the light resistance test thus obtained, a residual ratio of the optical density was calculated according to (optical density after light resistance test)/(optical density before light resistance test)×100%, and the light resistance was evaluated according to the following evaluation criteria:

A: The residual ratio of the optical density was 80% or more.
B: The residual ratio of the optical density was 75% or more and less than 80%.
C: The residual ratio of the optical density was 70% or more and less than 75%.
D: The residual ratio of the optical density was less than 70%.

Ozone Resistance

The above-described ink jet recording apparatus was used for producing a recorded product by recording a solid image with a recording duty of 50% on a recording medium (tradename "Canon Photographic Paper, Gloss Pro <Platinum Grade> PT101", manufactured by Canon Inc.) under an environment of a temperature of 23° C. and relative humidity of 55%. The obtained recorded product was dried for 24 hours under an environment of a temperature of 23° C. and relative humidity of 55%. The optical density of the solid image in the obtained recorded product was measured (as an optical density before an ozone resistance test). The recorded product was placed in an ozone test apparatus (tradename "OMS-H", manufactured by Suga Test Instruments Co., Ltd.), so as to be exposed to ozone at a temperature within a vessel of 23° C. relative humidity of 60% and an ozone gas concentration of 10 ppm for 24 hours. Thereafter, the optical density of the solid image in the recorded product was measured (as an optical density after the ozone resistance test). Based on the values of the optical density before the ozone resistance test and the optical density after the ozone resistance test thus obtained, a residual ratio of the optical density was calculated according to (optical density after ozone resistance test)/(optical density before ozone resistance test)×100%, and the ozone resistance was evaluated according to the following evaluation criteria:

AA: The residual ratio of the optical density was 94% or more.
A: The residual ratio of the optical density was 92% or more and less than 94%.
B: The residual ratio of the optical density was 90% or more and less than 92%.
C: The residual ratio of the optical density was 85% or more and less than 90%.
D: The residual ratio or the optical density was less than 85%.

Intermittent Election Stability

The ink cartridge was installed in an ink jet recording apparatus obtained by modifying the aforementioned ink jet recording apparatus, and the following operation was performed under an environment of a temperature of 15° C. and relative humidity of 10%. The ink jet recording apparatus was allowed to stand still for more than 5 hours without ejecting an ink while preventing increase of the temperature of the ink present in the vicinity of an ejection orifice of a recording head, and then, the ink was ejected. Thereafter, the ejection of the ink was suspended for 5 seconds, and the ink was ejected again without performing a recovering operation or the like for the recording head, so as to produce a recorded product by recording vertical ruled lines on a recording medium (tradename "HR-101", manufactured by Canon Inc.). The vertical ruled lines of the obtained recorded product were visually checked, and the intermittent ejection stability was evaluated according to the following evaluation criteria:

AA: None of the ruled lines was disordered.
A: Positions or respective dots were varied and the ruled lines looked wavy.
B: Gaps were formed between adjacent dots.

TABLE 4

| | | Evaluation Results | | |
|---|---|---|---|---|
| | | Light Resistance | Ozone Resistance | Intermittent Ejection Stability |
| Example | 1 | A | AA | AA |
| | 2 | A | A | AA |
| | 3 | A | A | AA |
| | 4 | A | A | AA |
| | 5 | A | AA | AA |
| | 6 | A | AA | AA |
| | 7 | A | AA | AA |
| | 8 | A | AA | AA |
| | 9 | A | AA | A |
| | 10 | A | AA | AA |
| | 11 | A | AA | AA |
| | 12 | A | AA | A |
| | 13 | A | AA | AA |
| | 14 | A | AA | A |
| | 15 | A | AA | A |
| | 16 | A | A | A |
| Comparative Example | 1 | B | B | B |
| | 2 | B | B | AA |
| | 3 | B | B | B |
| | 4 | B | B | B |
| | 5 | B | B | B |
| | 6 | B | B | B |
| | 7 | A | AA | B |
| | 8 | B | B | A |
| | 9 | B | B | A |
| | 10 | B | B | A |

TABLE 4-continued

| | Evaluation Results | | |
|---|---|---|---|
| | Light Resistance | Ozone Resistance | Intermittent Ejection Stability |
| 11 | B | B | A |
| 12 | C | C | B |
| 13 | C | C | B |
| 14 | D | D | AA |

When the ink of Comparative Example 14 was put in a closed vessel and allowed to stand still under an environment of a temperature of 60° C. for 12 hours, an oily component was separated on the surface of the ink. Besides, the surface tension of this ink was increased by 2 mN/m as compared with that before the standing. If seems that the affinity between a coloring material and a surfactant contained in the ink of Comparative Example 14 was low and hence the surfactant was separated. In this manner, surfactants having an average of x+y failing in the range of $4.0 \leq x+y \leq 8.0$ have high hydrophobicity, and therefore, many of such surfactants are separated when combined with a general coloring material other than the compound represented by the general formula (I).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176885, filed Aug. 9, 2012, which is hereby incorporated by reference herein in its entirety.

What is claimed is:

1. An ink jet ink comprising a coloring material and a water-soluble organic solvent,
    wherein the coloring material comprises a compound represented by the following formula (I),
    the water-soluble organic solvent comprises ethylene urea and an alkanediol having 4 to 6 carbon atoms, and
    a content A (% by mass) of the coloring material, a content B (% by mass) of the ethylene urea and a content C (% by mass) of the alkanediol having 4 to 6 carbon atoms based on a total mass of the ink satisfy relationships of $0.20 \leq B/A \leq 10.0$ and $0.10 \leq C/A \leq 10.0$:

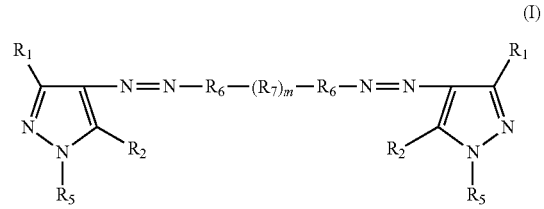

(I)

where $R_1$ represents a monovalent group, $R_2$ represents —$OR_3$ or —$NHR_4$, wherein $R_3$ and $R_4$ each represent a hydrogen atom or a monovalent group, $R_5$ represents an alkyl group, an aryl group or a monovalent triazine ring group, $R_6$ represents an arylene group or a divalent heterocyclic group, $R_7$ represents a divalent linking group, and m represents 0 or 1.

2. The ink according to claim 1, wherein the coloring material comprises a compound represented by the following general formula (II):

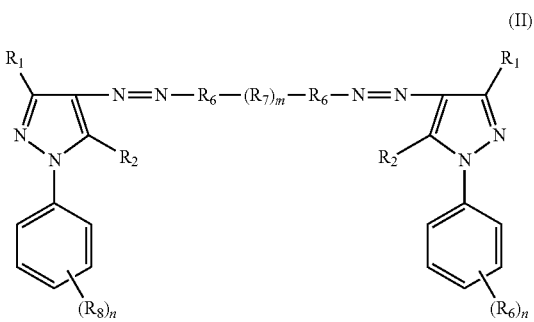
(II)

where $R_1$ represents a monovalent group, $R_2$ represents $—OR_3$ or $—NHR_4$, wherein $R_3$ and $R_4$ each represent a hydrogen atom or a monovalent group, $R_6$ represents an arylene group or a divalent heterocyclic group, $R_7$ represents a divalent linking group, m represents 0 or 1, $R_8$ represents an ionic group, and n represents 1 or 2.

3. The ink according to claim 1, wherein the alkanediol having 4 to 6 carbon atoms comprise 1,5-pentanediol.

4. The ink according to claim 1, wherein the water-soluble organic solvent further comprises a compound represented by the following general formula (III):

(III)

where $R_{10}$ each independently represents a hydroxyalkyl group, and $R_{11}$ represents $—S(=O)—$ or $—S(=O)_2—$.

5. The ink according to claim 1, further comprising a surfactant represented by the following general formula (IV), wherein a content D (% by mass) of the surfactant represented by the general formula (IV), the content B (% by mass) or the ethylene urea and the content C (% by mass) of the alkanediol having 4 to 6 carbon atoms based on the total mass of the ink satisfy a relationship of $B/(B+C) \le 0.40$,

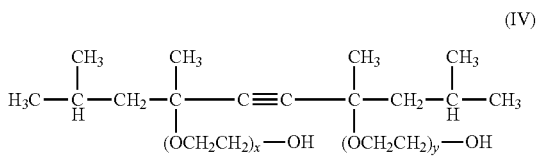
(IV)

where $4.0 \le x+y \le 8.0$.

6. An ink cartridge comprising an ink and an ink storage portion storing the ink, wherein the ink comprises the ink according to claim 1.

7. An ink jet recording method comprising ejecting an ink from a recording head of an ink jet system to record an image on a recording medium, wherein the ink comprises the ink according to claim 1.

* * * * *